US012675857B2

(12) United States Patent　　　　(10) Patent No.:　US 12,675,857 B2
Lei et al.　　　　　　　　　　　　　(45) Date of Patent:　　Jul. 7, 2026

(54) METHOD FOR EXTENDING DYNAMIC RANGE OF IMAGE AND ELECTRONIC DEVICE

(71) Applicant: Honor Device Co., Ltd., Shenzhen (CN)

(72) Inventors: Caihua Lei, Shenzhen (CN); Liyou Wu, Shenzhen (CN); Zhicheng Hu, Shenzhen (CN); Yue Ding, Shenzhen (CN); Tao Shao, Shenzhen (CN); Jiasen Zhang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 371 days.

(21) Appl. No.: 18/548,115

(22) PCT Filed: Apr. 13, 2023

(86) PCT No.: PCT/CN2023/088196
§ 371 (c)(1),
(2) Date: Aug. 28, 2023

(87) PCT Pub. No.: WO2024/011976
PCT Pub. Date: Jan. 18, 2024

(65) Prior Publication Data
US 2025/0022111 A1　　Jan. 16, 2025

(30) Foreign Application Priority Data

Jul. 14, 2022　(CN) ......................... 202210827757.2

(51) Int. Cl.
*G06T 5/92*　　　　(2024.01)
*G06T 3/40*　　　　(2024.01)
(Continued)

(52) U.S. Cl.
CPC .................. *G06T 5/92* (2024.01); *G06T 3/40* (2013.01); *G06T 5/40* (2013.01); *G06T 7/12* (2017.01);
(Continued)

(58) Field of Classification Search
CPC .... G06T 5/92; G06T 3/40; G06T 5/40; G06T 7/12; G06T 7/136; G06T 2207/10024;
(Continued)

(56) References Cited

U.S. PATENT DOCUMENTS

| | | | | |
|---|---|---|---|---|
| 8,289,412 | B2 * | 10/2012 | Banterle | ................... G06T 5/50 |
| | | | | 348/222.1 |
| 8,314,847 | B2 * | 11/2012 | Brunner | ................. H04N 23/70 |
| | | | | 348/222.1 |

(Continued)

FOREIGN PATENT DOCUMENTS

| | | |
|---|---|---|
| CN | 103295194 A | 9/2013 |
| CN | 106017694 A | 10/2016 |

(Continued)

OTHER PUBLICATIONS

Celebi, Aysun Tasyapi, Ramazan Duvar, and Oguzhan Urhan. "Fuzzy fusion based high dynamic range imaging using adaptive histogram separation." IEEE Transactions on consumer electronics 61.1 (2015): 119-127. (Year: 2015).*

(Continued)

*Primary Examiner* — Henok Shiferaw
*Assistant Examiner* — Dion J Satcher

(57) ABSTRACT

A method includes: obtaining original image information, where the original image information includes an original image and brightness level information; obtaining, based on the brightness level information included in the original image information and a brightness threshold, a thresholding segmentation result corresponding to the original image, (Continued)

where the thresholding segmentation result includes area class labels corresponding to pixels in the original image, the area class labels are used to indicate classes of areas corresponding to the pixels in the original image, the areas include a standard dynamic range area and an extended dynamic range area; and performing dynamic range extension on the extended dynamic range area in the original image based on the thresholding segmentation result corresponding to the original image, to obtain an extended dynamic range image corresponding to the original image.

16 Claims, 10 Drawing Sheets

(51) Int. Cl.

| | | |
|---|---|---|
| *G06T 5/40* | (2006.01) | |
| *G06T 7/12* | (2017.01) | |
| *G06T 7/136* | (2017.01) | |

(52) U.S. Cl.
CPC .... *G06T 7/136* (2017.01); *G06T 2207/10024* (2013.01); *G06T 2207/20208* (2013.01)

(58) Field of Classification Search
CPC ... G06T 2207/20208; G06T 5/50; G06T 5/94; G06T 2207/10144; G06T 7/11; G06T 2207/10004; G06T 5/90; H04N 23/12; H04N 23/71; H04N 23/741
USPC .......................................................... 382/162
See application file for complete search history.

(56) References Cited

U.S. PATENT DOCUMENTS

| | | | | |
|---|---|---|---|---|
| 10,397,473 | B2* | 8/2019 | Matsuoka | ............ H04N 23/951 |
| 11,252,339 | B2* | 2/2022 | Bammes | .............. H04N 25/445 |
| 11,379,959 | B2 | 7/2022 | Meng et al. | |
| 11,715,184 | B2* | 8/2023 | Johnson | .................... G06T 5/92 |
| | | | | 348/231.99 |
| 2010/0085361 | A1 | 4/2010 | Kim et al. | |
| 2014/0079319 | A1* | 3/2014 | Lin | ........................... G06T 5/40 |
| | | | | 382/167 |
| 2016/0065864 | A1 | 3/2016 | Guissin | |
| 2018/0232867 | A1* | 8/2018 | Park | .......................... G06T 5/92 |
| 2019/0347777 | A1 | 11/2019 | Meng et al. | |
| 2021/0349027 | A1 | 11/2021 | Fei et al. | |

FOREIGN PATENT DOCUMENTS

| | | |
|---|---|---|
| CN | 106886386 A | 6/2017 |
| CN | 108305232 A | 7/2018 |
| CN | 109544463 A | 3/2019 |
| CN | 110599433 A | 12/2019 |
| CN | 112150399 A | 12/2020 |
| CN | 113344810 A | 9/2021 |
| CN | 113360964 A | 9/2021 |
| CN | 113592727 A | 11/2021 |
| CN | 113691724 A | 11/2021 |
| CN | 114257750 A | 3/2022 |
| CN | 114897745 A | 8/2022 |
| WO | 2019183813 A1 | 10/2019 |
| WO | 2021036991 A1 | 3/2021 |

OTHER PUBLICATIONS

Singh, T. Romen, et al. "A new local adaptive thresholding technique in binarization." arXiv preprint arXiv:1201.5227 (2012). (Year: 2012).*

Jin, C., et al. "Learning to downsample for segmentation of ultra-high resolution images. arXiv 2021." arXiv preprint arXiv:2109.11071. (Year: 2021).*

Raju, P. Daniel Ratna, and G. Neelima. "Image segmentation by using histogram thresholding." International Journal of Computer Science Engineering and Technology 2.1 (2012): 776-779. (Year: 2012).*

çelebi Aysun et al.;"Fuzzy Fusion Based High Dynamic Range Imaging using Adaptive Histogram Separation";IEEE Transactions on Consumer Electronics, vol. 61, Issue 1;Feb. 1, 2015;9 pages.

P. K. Sahoo et al; "A survey of thresholding techniques"; Computer Vision, Graphics, and Image Processing, vol. 41, Issue 2+ Feb. 1, 2015;28 pages.

Salem Saleh Al-amri et al; "Image Segmentation by Using Thershod Techniques";Journal of Computing vol. 2, Issue 5, May 2010;4 pages.

Liu Ying et al; "High dynamic range imaging algorithm based on luminance partition fuzzy fusion"; Journal of Computer Applications; Jan. 10, 2010; 6 pages(with English abstract).

Yu Changzhi et al; "Adaptive Binocular Fringe Dynamic Projection Method for High Dynamic Range Measurement"; Sensors;Sep. 18, 2019; 20 pages.

Ding Chang;"Review of "histogram" equalization technique for image enhancement"; Computer Engineering and Applications;Dec. 31, 2017; 6 pages (with English abstract).

Ao yan-li; "Introduction to digital image pre-processing and segmentation "2015 Seventh International Conference on Measuring Technology and Mechatronics Automation;Sep. 14, 2015; 6 pages.

Zhou Yangin et al; "A Detail Preserving Single Exposure HDR Image Generation Method"; Modern Computer; Jul. 15, 2021; 6 pages (with English abstract).

Xu Zhanpeng; "Research on Illumination Consistency based on single low dynamic range image"; the Degree of Master of Engineering; Dec. 15, 2016; 53 pages (with English abstract).

* cited by examiner

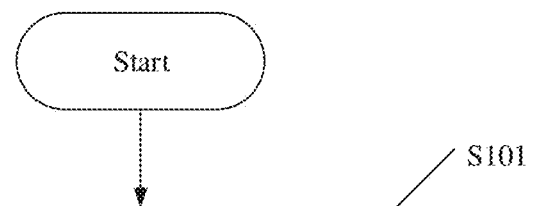

S101

Obtain original image information, where the original image information includes an original image and brightness level information, and the brightness level information is used to indicate a brightness value of a pixel in the original image

S102

Obtain, based on the brightness level information included in the original image information and a brightness threshold, a thresholding segmentation result corresponding to the original image, where the thresholding segmentation result includes area class labels corresponding to pixels in the original image, the area class labels are used to indicate classes of areas corresponding to the pixels in the original image, the areas include a standard dynamic range area and an extended dynamic range area, a brightness value corresponding to a pixel in the standard dynamic range area is less than the brightness threshold, and a brightness value corresponding to a pixel in the extended dynamic range area is greater than or equal to the brightness threshold

S103

Associatively store the original image and the thresholding segmentation result corresponding to the original image, for subsequently performing dynamic range extension on the extended dynamic range area in the original image based on the thresholding segmentation result corresponding to the original image, to generate an extended dynamic range image corresponding to the original image, where a dynamic range of the extended dynamic range image is greater than a dynamic range of the original image

FIG. 4

Exposure image

Exposure image

Start

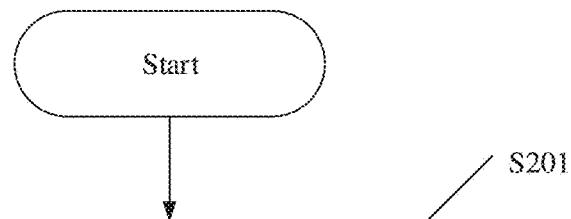

S201

Obtain an original image and a thresholding segmentation result corresponding to the original image, where the thresholding segmentation result includes area class labels corresponding to pixels in the original image, areas corresponding to the pixels include an extended dynamic range area and a standard dynamic range area, a brightness value of a pixel in the extended dynamic range area is greater than or equal to a brightness threshold, and a brightness value of a pixel in the standard dynamic range area is less than the brightness threshold

S202

Perform dynamic range extension on the extended dynamic range area in the original image based on the thresholding segmentation result corresponding to the original image, to obtain an extended dynamic range image, where a dynamic range of the extended dynamic range image is greater than a dynamic range of the original image

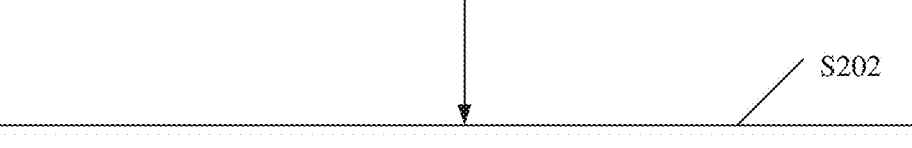

FIG. 8

METHOD FOR EXTENDING DYNAMIC RANGE OF IMAGE AND ELECTRONIC DEVICE

CROSS-REFERENCE TO RELATED APPLICATIONS

This application is a national stage of International Application No. PCT/CN2023/088196 filed on Apr. 13, 2023, which claims priority to Chinese Patent Application No. 202210827757.2 filed on Jul. 14, 2022. The disclosures of both of the aforementioned application are hereby incorporated by reference in their entireties.

TECHNICAL FIELD

This application relates to the image processing field, and in particular, to a method for extending a dynamic range of an image and an electronic device.

BACKGROUND

Dynamic ranges of an image obtained by a conventional imaging display device and an image that can be displayed by the conventional imaging display device are quite limited. Therefore, an image viewed by a user from the conventional imaging display device is relatively different from that in a real scene, leading to relatively poor user experience. In recent years, with continuous improvement of software and hardware technologies in the display field, use of high dynamic range (High Dynamic Range, HDR) displays is becoming more popularized. Therefore, a dynamic range of the image obtained by the conventional imaging display device needs to be extended to bring a visual effect closer to that in a real scene to a user, to improve user experience.

SUMMARY

This application provides a method for extending a dynamic range of an image and an electronic device, to extend a dynamic range of an original image, thereby improving a visual experience effect of a user.

To achieve the foregoing objective, the following technical solutions are used in this application:

According to a first aspect, this application provides a method for extending a dynamic range of an image. The method includes:

obtaining original image information, where the original image information includes an original image and brightness level information, and the brightness level information is used to indicate a brightness value of a pixel in the original image;

obtaining, based on the brightness level information included in the original image information and a brightness threshold, a thresholding segmentation result corresponding to the original image, where the thresholding segmentation result includes area class labels corresponding to pixels in the original image, the area class labels are used to indicate classes of areas corresponding to the pixels in the original image, the areas include a standard dynamic range area and an extended dynamic range area, a brightness value corresponding to a pixel in the standard dynamic range area is less than the brightness threshold, and a brightness value corresponding to a pixel in the extended dynamic range area is greater than or equal to the brightness threshold; and associatively storing the original image and the thresholding segmentation result corresponding to the original image, for subsequently performing dynamic range extension on the extended dynamic range area in the original image based on the thresholding segmentation result corresponding to the original image, to generate an extended dynamic range image corresponding to the original image, where a dynamic range of the extended dynamic range image is greater than a dynamic range of the original image.

It should be understood that in the foregoing solution, the thresholding segmentation result corresponding to the original image is obtained based on the brightness level information included in the original image information, and the original image and the thresholding segmentation result corresponding to the original image are associatively stored. The thresholding segmentation result includes the area class labels corresponding to the pixels in the original image. The area class labels may indicate whether the pixels in the original image correspond to the standard dynamic range area (an area in which a brightness value is less than the brightness threshold) or the extended dynamic range area (an area in which a brightness value is greater than or equal to the brightness threshold). In this way, when dynamic range extension needs to be performed on the original image (for example, an LDR image or an SDR image captured by a camera), dynamic range extension may be performed on the extended dynamic range area in the original image based on the thresholding segmentation result corresponding to the original image, so that dynamic range extension to the original image is implemented to obtain the extended dynamic range image that corresponds to the original image and that has a larger dynamic range than the original image, thereby better reflecting gradients and levels in light and a color in the image and bringing a visual effect closer to that in a real world to a user. In addition, the stored thresholding segmentation result corresponding to the original image includes only the area class labels corresponding to the pixels in the original image, and therefore, a data amount is small, and required storage space is small.

In a possible implementation of the first aspect, the brightness level information is an exposure image captured in a same scene as the original image. A photographed object in the exposure image is the same as a photographed object in the original image. A brightness value of each pixel in the exposure image indicates a brightness value of a corresponding pixel in the original image. Further, the obtaining, based on the brightness level information included in the original image information and a brightness threshold, a thresholding segmentation result corresponding to the original image may be obtaining, based on the brightness value of each pixel in the exposure image and the brightness threshold, the thresholding segmentation result corresponding to the original image.

It should be understood that the exposure image in the foregoing implementation is captured in the same scene as the original image, and the photographed object in the exposure image is the same as the photographed object in the original image. Therefore, the brightness value of each pixel in the exposure image may be used to indicate the brightness value of the corresponding pixel in the original image. The thresholding segmentation result corresponding to the original image may be obtained based on the brightness value included in the exposure image and the brightness threshold.

In this way, when dynamic range extension is subsequently performed on the extended dynamic range area in the original image based on the thresholding segmentation result corresponding to the original image, dynamic range extension is actually performed on the original image with reference to the brightness value of each pixel in the exposure image, and therefore, richer information is used, and an effect of dynamic range extension is better.

In a possible implementation of the first aspect, the obtaining, based on the brightness value of each pixel in the exposure image and the brightness threshold, the thresholding segmentation result corresponding to the original image may be: determining one brightness threshold based on the brightness value of each pixel in the exposure image, and performing single-level thresholding segmentation on the exposure image based on the one brightness threshold to obtain a thresholding segmentation result. The thresholding segmentation result includes area class labels corresponding to pixels in the original image. The area class labels are used to indicate classes of areas corresponding to the pixels in the original image. The areas in this implementation include one standard dynamic range area and one extended dynamic range area.

It should be understood that a single-level thresholding segmentation method may be used for an exposure image in which targets are relatively undiversified. Areas obtained in this case are only one standard dynamic range area and one extended dynamic range area, and corresponding area class labels have only two values. In this way, during storage, a corresponding thresholding segmentation result may be represented by a data sequence or a two-dimensional matrix (each element in the data sequence or the two-dimensional matrix has only two possible values, for example, 0 and 1), and storage space occupied for storing the thresholding segmentation result is smaller.

In a possible implementation of the first aspect, the obtaining, based on the brightness value of each pixel in the exposure image and the brightness threshold, the thresholding segmentation result corresponding to the original image may be: determining a plurality of brightness thresholds based on the brightness value of each pixel in the exposure image, and performing multi-level thresholding segmentation on the exposure image based on the plurality of brightness thresholds to obtain a thresholding segmentation result. The thresholding segmentation result includes area class labels corresponding to pixels in the original image. The area class labels are used to indicate classes of areas corresponding to the pixels in the original image. The areas in this implementation include one standard dynamic range area and a plurality of levels of extended dynamic range areas.

It should be understood that a multi-level thresholding segmentation method may be used for a relatively complex exposure image that includes a plurality of targets. Areas obtained in this case include one standard dynamic range area and a plurality of different levels of extended dynamic range areas. Corresponding area class labels have more than two values. In this solution, multi-level thresholding segmentation is performed on a relatively complex exposure image to obtain a plurality of areas with a finer segmentation granularity, namely, one standard dynamic range area and a plurality of levels of extended dynamic range areas. Therefore, when tone mapping is subsequently performed by using a corresponding extension coefficient, an image with richer brightness gradients and levels may be obtained.

In a possible implementation of the first aspect, the foregoing threshold may be determined based on the brightness value of each pixel in the exposure image. Specifically, a corresponding brightness histogram is constructed based on the brightness value of each pixel in the exposure image. The brightness histogram may display quantities of pixels whose brightness values are 0, 1, . . . and 255 in the exposure image. The brightness histogram includes an x-axis and a y-axis, values on the x axis represent brightness values, which are sequentially 0, 1, . . . and 255, and values on the y-axis represent quantities of pixels. The quantities of pixels whose brightness values are 0, 1, . . . , k, . . . , and 255 in the exposure image, denoted as $y_0$, $y_1$, . . . $y_k$, . . . and $y_{255}$, are obtained based on the brightness histogram. $y_0$ is a quantity of pixels whose brightness values x are 0 in the exposure image, $y_1$ is a quantity of pixels whose brightness values x are 1 in the exposure image, $y_k$ is a quantity of pixels whose brightness values x are k in the exposure image, and $y_{255}$ is a quantity of pixels whose brightness values x are 255 in the exposure image. Corresponding quantities of pixels in the exposure image are added one by one in descending order of brightness values x, and a brightness value k is used as the threshold when a total quantity of pixels obtained when the addition reaches the quantity $y_k$ of pixels corresponding to the brightness value k is greater than a preset quantity.

It should be noted that the foregoing implementation may be used to determine a single threshold in the single-level thresholding segmentation method, and may also be used to determine a plurality of brightness thresholds in the multi-level thresholding segmentation method. For example, if the preset quantity has a unique value, a unique threshold may be obtained; or if the preset quantity has a plurality of values, a plurality of brightness thresholds may be obtained.

In a possible implementation of the first aspect, the foregoing threshold may be determined based on the brightness value of each pixel in the exposure image. Specifically, a corresponding brightness histogram is constructed based on the brightness value of each pixel in the exposure image. The brightness histogram may display quantities of pixels whose brightness values are 0, 1, . . . and 255 in the exposure image. The threshold is determined based on the brightness histogram by using an OTSU algorithm (OTSU algorithm).

It should be noted that the foregoing implementation may be used to determine a single threshold by using the OTSU algorithm in the single-level thresholding segmentation method, and may also be used to determine a plurality of brightness thresholds by using the OTSU algorithm in the multi-level thresholding segmentation method.

In a possible implementation of the first aspect, the foregoing threshold may be determined based on the brightness value of each pixel in the exposure image. Specifically, an average value M and a standard deviation STD of brightness values of all pixels in the exposure image are calculated, and the brightness threshold T is calculated by using the following formula:

$$T = M + \beta \cdot STD$$

where $\beta$ is a standard deviation coefficient.

It should be noted that the foregoing implementation may be used to determine a single threshold in the single-level thresholding segmentation method, and may also be used to determine a plurality of brightness thresholds in the multi-level thresholding segmentation method. For example, the standard deviation coefficient $\beta$ may have a unique value, and in this case, a unique threshold T may be obtained: or the standard deviation coefficient $\beta$ has a plurality of different values, and in this case, a plurality of brightness thresholds T may be obtained.

In a possible implementation of the first aspect, the thresholding segmentation result is a data sequence. The area class labels corresponding to the pixels in the original image are represented by values of corresponding elements in the data sequence. The values of the elements in the data sequence include 0 and 1. A pixel that is in the original image and that corresponds to an element whose value is 0 in the data sequence corresponds to the standard dynamic range area. A pixel that is in the original image and that corresponds to an element whose value is 1 in the data sequence corresponds to the extended dynamic range area.

In a possible implementation of the first aspect, the thresholding segmentation result is a two-dimensional matrix. The area class labels corresponding to the pixels in the original image are represented by values of corresponding elements in the two-dimensional matrix. The values of the elements in the two-dimensional matrix include 0 and 1. A pixel that is in the original image and that corresponds to an element whose value is 0 in the two-dimensional matrix corresponds to the standard dynamic range area. A pixel that is in the original image and that corresponds to an element whose value is 1 in the two-dimensional matrix corresponds to the extended dynamic range area.

It should be understood that the single-level thresholding segmentation method may be used for an exposure image in which targets are relatively undiversified. Obtained area classes are only one standard dynamic range area and one extended dynamic range area, and corresponding area class labels have only two values. Therefore, an obtained thresholding segmentation result may be represented by a data sequence or a two-dimensional matrix, and elements in the data sequence or the two-dimensional matrix have only two values, so that storage space occupied by the thresholding segmentation result can be reduced.

In a possible implementation of the first aspect, before the associatively storing the original image and the thresholding segmentation result corresponding to the original image, the method further includes: assuming that the thresholding segmentation result corresponding to the original image is I, performing downsampling processing on the thresholding segmentation result I corresponding to the original image to obtain a downsampled thresholding segmentation result I' corresponding to the original image. Further, the associatively storing the original image and the thresholding segmentation result corresponding to the original image includes: associatively storing the original image and the downsampled thresholding segmentation result I' corresponding to the original image.

It should be understood that performing downsampling processing on the thresholding segmentation result corresponding to the original image can effectively reduce a data size of the thresholding segmentation result. Performing storage after downsampling processing is performed on the thresholding segmentation result corresponding to the original image can reduce storage space occupied by the thresholding segmentation result.

According to a second aspect, this application provides a method for extending a dynamic range of an image, including:

obtaining an original image and a thresholding segmentation result corresponding to the original image, where the thresholding segmentation result includes area class labels corresponding to pixels in the original image, areas include an extended dynamic range area and a standard dynamic range area, a brightness value of a pixel in the standard dynamic range area is less than the brightness threshold, and a brightness value of a pixel in the extended dynamic range area is greater than or equal to the brightness threshold; and performing dynamic range extension on the extended dynamic range area in the original image based on the thresholding segmentation result corresponding to the original image, to generate an extended dynamic range image corresponding to the original image, where a dynamic range of the extended dynamic range image is greater than a dynamic range of the original image.

It should be understood that in the foregoing solution, when dynamic range extension is performed on the original image, it is determined, based on the thresholding segmentation result, whether a pixel in the original image corresponds to the standard dynamic range area or the extended dynamic range area, and dynamic range extension is performed on the extended dynamic range area in the original image, so that dynamic range extension to the original image can be implemented, a dynamic range of the original image is larger, and the extended dynamic range image that has a larger dynamic range than the original image is obtained, thereby better reflecting gradients and levels in light and a color in the image and bringing a visual effect closer to that in a real world to a user.

In a possible implementation of the second aspect, the performing dynamic range extension on the extended dynamic range area in the original image based on the thresholding segmentation result corresponding to the original image, to generate an extended dynamic range image corresponding to the original image includes: performing the following determining and operations on each pixel in the original image:

determining, based on the area class labels that correspond to the pixels in the original image and that are included in the thresholding segmentation result corresponding to the original image, whether the pixel corresponds to the standard dynamic range area or the extended dynamic range area; and if the pixel P corresponds to the standard dynamic range area, an extension coefficient $\alpha_P$ corresponding to the pixel P is equal to 1, and directly using R, G, and B values of the pixel P as R, G, and B values of a pixel P' that is in the extended dynamic range image and that corresponds to the pixel; or if the pixel corresponds to the extended dynamic range area, an extension coefficient $\alpha_P$ corresponding to the pixel is greater than or equal to 1, multiplying R, G, and B values of the pixel P by the extension coefficient $\alpha_P$ to obtain new R, G, and B values, and using the new R, G, and B values as R, G, and B values of a pixel P' that is in the extended dynamic range image and that corresponds to the pixel P.

It should be understood that in the foregoing solution, the performing dynamic range extension on the extended dynamic range area in the original image based on the thresholding segmentation result corresponding to the original image is specifically: determining, based on the thresholding segmentation result corresponding to the original image, whether a pixel in the original image corresponds to the standard dynamic range area or the extended dynamic range area, and performing tone mapping on R, G, and B values of each pixel in the original image by using a corresponding extension coefficient, to obtain the extended dynamic range image. For a pixel corresponding to the standard dynamic range area (an area in which a brightness value is less than the brightness threshold), an extension coefficient corresponding to the pixel is set to 1, in other words, R, G, and B values of the pixel remain unchanged, and the pixel is not brightened. In other words, a brightness value of a pixel that is in the original image and that corresponds to the standard dynamic range area remains unchanged. For a pixel corresponding to the extended dynamic range area (an area in which brightness value is greater than or equal to the brightness threshold), R, G, and B values of the pixel are multiplied by an extension coefficient greater than or equal to 1 to obtain new R, G, and B values. In other words, a pixel that is in the original image and that corresponds to the extended dynamic range area is brightened through tone mapping. A dynamic range of an image is a ratio of a maximum brightness value to a minimum brightness value of pixels in the image, namely, the maximum brightness value of the pixels in the image/the minimum brightness value of the pixels in the image. Therefore, even if a brightness value of a pixel in a low-brightness area remains unchanged, after a pixel in a high-brightness area is brightened, the maximum brightness value in the image increases, and the dynamic range of the image also increases, so that dynamic range extension to the image can be implemented. An area corresponding to a pixel in the original image reflects a brightness value of the pixel in the original image. Therefore, in the foregoing solution, tone mapping is performed with reference to the brightness value and R, G, and B values of the pixel in the original image. Compared with tone mapping performed by using only the brightness value or the R, G, and B values of the pixel in the original image, the foregoing solution of this application uses richer information, and achieves a better effect of dynamic range extension. In addition, in the solution, a pixel that is in the original image and that corresponds to a low-brightness area is not brightened, so that a data amount of image processing can be reduced, thereby accelerating dynamic range extension to the image and improving real-time performance.

In a possible implementation of the second aspect, that if the pixel P corresponds to the extended dynamic range area, an extension coefficient $\alpha_P$ corresponding to the pixel is greater than or equal to 1 includes:

if the pixel corresponds to the extended dynamic range area, converting the R, G, and B values of the pixel P into a grayscale value Gray;

obtaining, based on a tone mapping function F(x), a tone mapping function value F(Gray) corresponding to the grayscale value Gray, where the tone mapping function F(x) is a monotonically non-decreasing function, and F(x)≥1; and using the tone mapping function value F(Gray) as the extension coefficient $\alpha_P$ corresponding to the pixel.

It should be understood that in the foregoing solution, for a pixel in the extended dynamic range area, an extension coefficient of the pixel is determined based on a grayscale value of the pixel and the tone mapping function. The tone mapping function is a monotonically non-decreasing function, and a function value of the tone mapping function is greater than or equal to 1. In this way, for different pixels with different grayscale values in the extended dynamic range area, different extension coefficients may be calculated by using the tone mapping function.

Therefore, different pixels in the extended dynamic range area in the original image may be brightened to different extents based on different extension coefficients, so that brightness values of the pixels in the original image can be evenly mapped to brightness value intervals that meet a display requirement, to obtain a corresponding extended dynamic range image.

Based on the foregoing technical solution, when the thresholding segmentation result is obtained based on brightness information of an exposure image, the exposure image is preferably a short-exposure image or a medium-exposure image. Because brightness of the short-exposure image or the medium-exposure image is relatively suitable, especially information on a relatively bright part of the image is not lost, better color gradients and levels can be obtained when pixels in the extended dynamic range area in the original image are subsequently brightened. With reference to the foregoing technical solution, a pixel in the standard dynamic range area in the original image is not brightened, and a pixel value of the pixel remains unchanged. Therefore, even if information on a relatively dark part of the short-exposure image or the medium-exposure image is incomplete, an effect of dynamic range extension in the foregoing technical solution is not affected.

Corresponding to a possible implementation of the first aspect, if the thresholding segmentation result is a down-sampled thresholding segmentation result I' corresponding to the original image, the following method is used to perform dynamic range extension on the extended dynamic range area in the original image, to generate the extended dynamic range image corresponding to the original image: Upsampling processing is performed on the thresholding segmentation result I' to obtain a thresholding segmentation result I", and dynamic range extension is performed on the extended dynamic range area in the original image based on the upsampled thresholding segmentation result I", to generate the extended dynamic range image corresponding to the original image.

It should be understood that the thresholding segmentation result I" obtained after upsampling processing is performed on the downsampled thresholding segmentation result I' corresponding to the original image has a same size as the original image, and pixels in the thresholding segmentation result I" may be in a one-to-one correspondence with pixels in the original image. In this way, an extension coefficient corresponding to each pixel in the original image may be determined by using the thresholding segmentation result, so that dynamic extension is performed on the original image.

For specific implementations of the steps of the second aspect, refer to related descriptions in the first aspect and the possible implementations of the first aspect. Details are not described herein again.

According to a third aspect, this application provides an electronic device. The electronic device includes a memory and one or more processors. The memory is coupled to the processor. The memory stores computer program code, the computer program code includes computer instructions, and when the computer instructions are executed by the processor, the electronic device is enabled to perform the method in any one of the first aspect or the second aspect and the possible implementations of the first aspect or the second aspect.

In a possible implementation of the third aspect, the electronic device includes one or more cameras, and the cameras are configured to collect original image information.

In a possible implementation of the third aspect, the electronic device includes a communication module, and the communication module is configured to perform data transmission with another device to obtain an original image and a thresholding segmentation result corresponding to the original image.

According to a fourth aspect, this application provides a computer-readable storage medium, including computer instructions. When the computer instructions run on a computer, the computer is enabled to perform the method in any one of the first aspect or the second aspect and the possible implementations of the first aspect or the second aspect.

It may be understood that for specific implementations of the third aspect to the fourth aspect, refer to related descriptions in the first aspect, the second aspect, and any possible implementation of the first aspect and the second aspect. For technical effects brought by the third aspect and the fourth aspect, also refer to technical effects brought by the first aspect, the second aspect, and any possible implementation of the first aspect and the second aspect. Details are not described herein again.

BRIEF DESCRIPTION OF DRAWINGS

FIG. 4 is a flowchart of a method for extending a dynamic range of an image according to an embodiment of this application;

FIG. 8 is a flowchart of another method for extending a dynamic range of an image according to an embodiment of this application;

DESCRIPTION OF EMBODIMENTS

Figure 1:
FIG. 1 is an effect diagram of an original image according to an embodiment of this application.

In the following descriptions, the terms "first" and "second" are used merely for the purpose of description, and shall not be construed as indicating or implying relative importance or implicitly indicating a quantity of indicated technical features. Therefore, a feature defined as "first" or "second" may explicitly or implicitly include one or more of the features. In the descriptions of this application, unless otherwise stated, "a plurality of" means two or more.

In the descriptions of embodiments of this application, the term "include", "have", or any other variant thereof is intended to cover non-exclusive inclusion, so that a process, method, article, or apparatus that includes a series of elements includes not only those elements but also other elements that are not explicitly listed, or includes elements inherent to such a process, method, article, or apparatus. Without further limitation, the element defined by the sentence "including a . . . " does not exclude that other identical elements also exist in the process, method, article, or apparatus including the element.

To better understand the solutions of this application, the following describes some terms and application scenarios in embodiments of this application.

A dynamic range (Dynamic Range, DR) is a ratio of a maximum value to a minimum value of a variable signal (for example, sound or light). In the nature world, a brightness difference between objects is quite large. For example, a brightness value of the sun is approximately $1.5\text{E}+9$ cd/m$^2$, a brightness value of a daylight lamp is approximately $1.2\text{E}+4$ cd/m$^2$ (candelas/square meters), a brightness value of moonlight (of a full moon) is approximately 1000 cd/m$^2$, a brightness value of a fluorescent screen of a black-and-white television is approximately 120 cd/m$^2$, and a brightness value of a fluorescent screen of a color television is approximately 80 cd/m$^2$. A difference between them is quite large, and a dynamic range is quite large.

In the image field, the dynamic range is a range of light brightness in a scene that can be captured by a camera, and may be represented by a ratio of maximum brightness to minimum brightness that can be recorded by the camera in a single frame of image, namely, a ratio of a maximum brightness value to a minimum brightness value of pixels in the image. Compared with low dynamic range (Lower Dynamic Range, LDR) imaging or standard dynamic range (Standard Dynamic Range, SDR) imaging, high dynamic range (High Dynamic Range, HDR) imaging has a larger dynamic range (namely, a larger brightness difference), can more accurately reflect a range of brightness change from an area to which sunlight is directly emitted to a darkest shadow in a real world, has a wider color range and richer image details, and can better reflect a visual effect in a real environment.

R, G, and B values of each pixel in the LDR image or the SDR image are usually encoded by using 8 bits, and a range of a brightness value represented by the 8 bits is only 0~255. Data bits for encoding each color channel of the HDR image are more than those for the LDR image or the SDR image, because the data bits can represent a larger dynamic range. Correspondingly, display color accuracy of the HDR image is larger, and gradients and levels in light and a color in the image can be better reflected.

However, an image formed by a conventional imaging apparatus usually has only a quite limited dynamic range. For example, Table I shows approximate dynamic ranges of several common imaging devices. A dynamic range in the real world is 100000:1. Therefore, the dynamic range of the image formed by the conventional imaging apparatus needs to be extended, so that the image can better reflect a real environment.

TABLE 1

| Imaging device | Dynamic range |
|---|---|
| Slideshow | 200:1 |
| Film | 500:1 |
| LCD | 1000:1 |
| Digital camera (12 bit) | 4000:1 |

In addition, conventional display devices such as a cathode ray tube (Cathode Ray Tube, CRT) display and a liquid crystal display (Liquid Crystal Display, LCD) can display only a limited dynamic range. With continuous improvement of software and hardware technologies in the display field in recent years, use of high dynamic range HDR displays is becoming more popularized. Therefore, images with different dynamic ranges need to be displayed for displays that support display of different dynamic ranges, so that performance and display effects of the displays are taken into account.

Figure 2:
FIG. 2 is an effect diagram of an extended dynamic range image according to an embodiment of this application.

To resolve the problem existing in the background, embodiments of this application provide a method for extending a dynamic range of an image. The method may be applied to an electronic device. The method includes: obtaining original image information: obtaining, based on brightness level information in the original image information and a brightness threshold, a thresholding segmentation result corresponding to the original image, where the thresholding segmentation result includes area class labels corresponding to pixels in the original image, the area class labels are used to indicate classes of areas corresponding to the pixels in the original image, and the areas include an extended dynamic range area and a standard dynamic range area; and associatively storing the original image and the thresholding segmentation result corresponding to the original image, for subsequently performing dynamic range extension on the extended dynamic range area in the original image based on the thresholding segmentation result corresponding to the original image, to generate an extended dynamic range image corresponding to the original image, where a dynamic range of the extended dynamic range image is greater than a dynamic range of the original image. In this way, when dynamic range extension needs to be performed on the original image (for example, an LDR image or an SDR image captured by a camera), dynamic range extension may be performed on the extended dynamic range area in the original image based on the thresholding segmentation result corresponding to the original image, so that dynamic range extension to the original image is implemented, a dynamic range of the original image is larger, and the extended dynamic range image that has a larger dynamic range than the original image is obtained. As shown in FIG. 1 and FIG. 2, the extended dynamic range image can better reflect gradients and levels in light and a color in the image than the original image. Based on the method provided in embodiments of this application, considering a performance limitation of a display, the original image can be displayed in a display that supports only display of a low dynamic range. In a display that supports display of a high dynamic range, the extended dynamic range image corresponding to the original image can be displayed, so that a visual effect closer to that in a real world can be brought to a user, thereby improving user experience. Therefore, the method provided in embodiments of this application is highly applicable. In addition, the stored thresholding segmentation result corresponding to the original image includes only the area class labels corresponding to the pixels in the original image, and therefore, a data amount is small, and required storage space is small.

The following describes implementations of embodiments of this application in detail with reference to the accompanying drawings.

For example, the electronic device in embodiments of this application may be a mobile phone, a tablet computer, an ultra-mobile personal computer (ultra-mobile personal computer, UMPC), a netbook, a personal digital assistant (personal digital assistant, PDA), or an augmented reality (augmented reality, AR)/a virtual reality (virtual reality, VR)

device. A specific form of the electronic device is not specifically limited in embodiments of this application.

The following describes a hardware structure of the electronic device (for example, an electronic device 300) by using an example in which the electronic device is a mobile phone.

Figure 3:
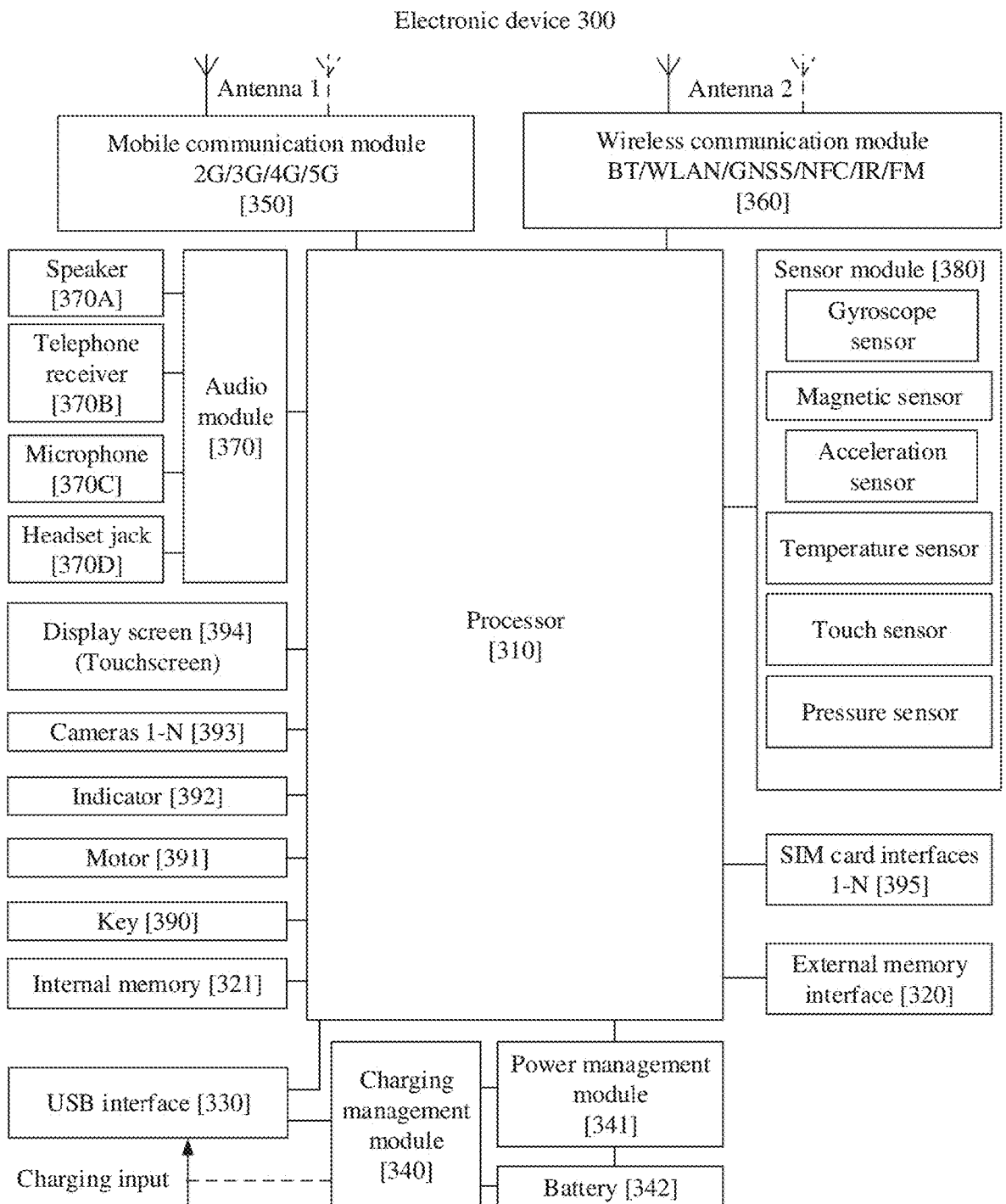
FIG. 3 is a schematic diagram of an electronic device according to an embodiment of this application.

As shown in FIG. 3, the electronic device 300 may include a processor 310, an external memory interface 320, an internal memory 321, a universal serial bus (universal serial bus, USB) interface 330, a charging management module 340, a power management module 341, a battery 342, an antenna 1, an antenna 2, a mobile communication module 350, a wireless communication module 360, an audio module 370, a speaker 370A, a telephone receiver 370B, a microphone 370C, a headset jack 370D, a sensor module 380, a key 390, a motor 391, an indicator 392, a camera 393, a display screen 394, a subscriber identity module (subscriber identification module, SIM) card interface 395, and the like.

The sensor module 380 may include a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like.

It may be understood that the structure illustrated in this embodiment does not constitute a specific limitation on the electronic device 300. In some other embodiments, the electronic device 300 may include more or fewer components than those shown in the figure, or may combine some components, or may split some components, or may have different component arrangements. Components shown in the figure may be implemented by using hardware, software, or a combination of software and hardware.

The processor 310 may include one or more processing units. For example, the processor 310 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a neural center and a command center of the electronic device 300. The controller may generate an operation control signal based on instruction operation code and a timing signal, to complete control of instruction fetching and instruction execution.

The memory may be further disposed in the processor 310, and is configured to store instructions and data. In some embodiments, the memory in the processor 310 is a cache. The memory may store instructions or data just used or cyclically used by the processor 310. If the processor 310 needs to use the instructions or the data again, the processor 310 may directly invoke the instructions or the data from the memory. This avoids repeated access and reduces waiting time of the processor 310, thereby improving system efficiency. In some embodiments, the processor 310 may include one or more interfaces.

It may be understood that an interface connection relationship between the modules illustrated in this embodiment is merely an example for description, and constitutes no limitation on the structure of the electronic device 300. In some other embodiments, the electronic device 300 may alternatively use an interface connection manner different from that in the foregoing embodiment, or use a combination of a plurality of interface connection manners.

The charging management module 340 is configured to receive charging input from a charger. The charger may be a wireless charger, or may be a wired charger. The charging management module 340 may further supply power to the electronic device by using the power management module 341 while charging the battery 342.

The power management module 341 is configured to connect to the battery 342, the charging management module 340, and the processor 310. The power management module 341 receives input of the battery 342 and/or the charging management module 340, to supply power to the processor 310, the internal memory 321, an external memory, the display screen 394, the camera 393, the wireless communication module 360, and the like.

A wireless communication function of the electronic device 300 may be implemented by using the antenna 1, the antenna 2, the mobile communication module 350, the wireless communication module 360, the modem processor, the baseband processor, and the like.

The antenna 1 and the antenna 2 are configured to transmit and receive electromagnetic wave signals. Each antenna in the electronic device 300 may be configured to cover one or more communication bands. Different antennas may be further multiplexed to improve antenna utilization. For example, the antenna 1 may be multiplexed as a diversity antenna of a wireless local area network. In some other embodiments, the antenna may be used in combination with a tuning switch.

The mobile communication module 350 may provide a solution for wireless communication including 2G/3G/4G/5G and the like applied to the electronic device 300. The mobile communication module 350 may include at least one filter, switch, power amplifier, low noise amplifier (low noise amplifier, LNA), and the like. The mobile communication module 350 may receive an electromagnetic wave through the antenna 1, perform processing such as filtering or amplification on the received electromagnetic wave, and send a processed electromagnetic wave to the modem processor for demodulation. The mobile communication module 350 may further amplify a signal modulated by the modem processor, and convert the signal into an electromagnetic wave through the antenna 1 for radiation.

The wireless communication module 360 may provide a wireless communication solution applied to the electronic device 300, including a wireless local area network (wireless local area networks, WLAN) (for example, a wireless fidelity (wireless fidelity, Wi-Fi) network). Bluetooth (bluetooth, BT), a global navigation satellite system (global navigation satellite system, GNSS), frequency modulation (frequency modulation, FM), near field communication (near field communication, NFC), an infrared (infrared, IR) technology, and the like.

In some embodiments, the antenna 1 and the mobile communication module 350 of the electronic device 300 are coupled, and the antenna 2 and the wireless communication module 360 of the electronic device 300 are coupled, so that the electronic device 300 can communicate with a network and another device by using a wireless communication technology.

The electronic device 300 implements a display function by using the GPU, the display screen 394, the application processor, and the like. The GPU is a microprocessor for image processing, and is connected to the display screen 394 and the application processor. The GPU is configured to perform mathematical and geometric calculation for graphics rendering. The processor 310 may include one or more GPUs that execute program instructions to generate or change display information.

The display screen 394 is configured to display an image, a video, or the like. The display screen 394 includes a display panel. For example, the display screen 394 may be a touchscreen.

The electronic device 300 may implement a photographing function by using the ISP, the camera 393, the video codec, the GPU, the display screen 394, the application processor, and the like. One or more cameras 393 may be disposed.

The external memory interface 320 may be configured to connect to an external storage card, for example, a Micro SD card, to expand a storage capacity of the electronic device 300. The external storage card communicates with the processor 310 through the external memory interface 320, to implement a data storage function. For example, files such as music and a video are stored in the external storage card.

The internal memory 321 may be configured to store computer executable program code, and the executable program code includes instructions. The processor 310 performs various function applications and data processing of the electronic device 300 by running the instructions stored in the internal memory 321. For example, in this embodiment of this application, the processor 310 may execute the instructions stored in the internal memory 321, and the internal memory 321 may include a program storage area and a data storage area. The program storage area may store an operating system, an application required by at least one function (for example, a sound playback function or an image playback function), and the like. The data storage area may store data (such as audio data and a phone book) and the like created during use of the electronic device 300.

The electronic device 300 may implement audio functions, for example, music playback and recording, by using the audio module 370, the speaker 370A, the telephone receiver 370B, the microphone 370C, the headset jack 370D, the application processor, and the like.

The touch sensor is also referred to as a "touch panel". The touch sensor may be disposed on the display screen 394. The touch sensor and the display screen 394 form a touchscreen, which is also referred to as a "touch control screen". The touch sensor is configured to detect a touch operation performed on or near the touch sensor. The touch sensor may transfer a detected touch operation to the application processor to determine a touch event type. Visual output related to the touch operation may be provided by using the display screen 394. In some other embodiments, the touch sensor may alternatively be disposed on a surface of the electronic device 300 at a location different from that of the display screen 394.

In this embodiment of this application, the electronic device 300 may detect, by using the touch sensor, a touch operation input by a user on the touchscreen, and collect one or more of a touch position, a touch time, and the like of the touch operation on the touchscreen. In some embodiments, the electronic device 300 may determine the touch position of the touch operation on the touchscreen by combining the touch sensor and the pressure sensor.

The key 390 includes a power on/off key, a volume key, and the like. The key 390 may be a mechanical key, or may be a touch key. The electronic device 300 may receive key input to generate key signal input related to user settings and function control of the electronic device 300.

The motor 391 may generate a vibration prompt. The motor 391 may be configured to provide a vibration prompt for an incoming call, and may also be configured to provide vibration feedback for touch. For example, touch operations performed on different applications (for example, photographing and audio playback) may correspond to different vibration feedback effects. The motor 391 may also correspond to different vibration feedback effects when touch operations are performed on different areas of the display screen 394. Different application scenarios (for example, a time reminder, information receiving, an alarm clock, and a game) may also correspond to different vibration feedback effects. A touch vibration feedback effect may be further customized.

The indicator 392 may be an indicator light, and may be configured to indicate a charging status and a power change, or may be configured to indicate a message, a missed call, a notification, or the like. The SIM card interface 395 is configured to connect to a SIM card. The SIM card may be inserted into the SIM card interface 395 or removed from the SIM card interface 395, so that the SIM card is in contact with or separated from the electronic device 300. The electronic device 300 may support 1 or M SIM card interfaces, where M is a positive integer greater than 1. The SIM card interface 395 may support a Nano SIM card, a Micro SIM card, a SIM card, or the like.

The gyroscope sensor may be a three-axis gyroscope for tracking state changes of the electronic device 300 in six directions. The acceleration sensor is configured to detect a motion speed, a direction, and a displacement of the electronic device 300. In this embodiment of this application, the electronic device 300 may detect a status and a location of the electronic device 300 by using the gyroscope sensor and the acceleration sensor. When the status and the location of the electronic device 300 greatly change compared with an initial location and an initial state, the electronic device 300 may prompt, in real time on the display screen 394, the user to correct the status and the location of the electronic device 300 in a timely manner.

Methods in the following embodiments may all be implemented in the electronic device 300 having the foregoing hardware structure.

Embodiments of this application provide a method for extending a dynamic range of an image. The method may be applied to the foregoing electronic device 300. In the following embodiments, an example in which the electronic device 300 is the mobile phone shown in FIG. 3 is used to describe the method in embodiments of this application.

Referring to FIG. 4, an embodiment of this application provides a method for extending a dynamic range of an image, including the following steps.

S101: Obtain original image information, where the original image information includes an original image and brightness level information, and the brightness level information is used to indicate a brightness value of a pixel in the original image.

S102: Obtain, based on the brightness level information included in the original image information and a brightness threshold, a thresholding segmentation result corresponding to the original image, where the thresholding segmentation result includes area class labels corresponding to pixels in the original image, the area class labels are used to indicate classes of areas corresponding to the pixels in the original image, the areas include a standard dynamic range area and an extended dynamic range area, a brightness value corresponding to a pixel in the standard dynamic range area is less than the brightness threshold, and a brightness value corresponding to a pixel in the extended dynamic range area is greater than or equal to the brightness threshold.

S103: Associatively store the original image and the thresholding segmentation result corresponding to the original image, for subsequently performing dynamic range extension on the extended dynamic range area in the original image based on the thresholding segmentation result corresponding to the original image, to generate an extended dynamic range image corresponding to the original image, where a dynamic range of the extended dynamic range image is greater than a dynamic range of the original image.

It should be understood that in the foregoing solution, the thresholding segmentation result corresponding to the original image is obtained based on the brightness level information included in the original image information, and the original image and the thresholding segmentation result corresponding to the original image are associatively stored. The thresholding segmentation result includes the area class labels corresponding to the pixels in the original image. The area class labels may indicate whether the pixels in the original image correspond to the standard dynamic range area (an area in which a brightness value is less than the brightness threshold) or the extended dynamic range area (an area in which a brightness value is greater than or equal to the brightness threshold). In this way, when dynamic range extension needs to be performed on the original image (for example, an LDR image or an SDR image captured by a camera), the extended dynamic range image corresponding to the original image may be generated based on the thresholding segmentation result corresponding to the original image, so that dynamic range extension to the original image is implemented to obtain the extended dynamic range image that has a larger dynamic range than the original image, thereby better reflecting gradients and levels in light and a color in the image and bringing a visual effect closer to that in a real world to a user. In addition, the stored thresholding segmentation result corresponding to the original image includes only the area class labels corresponding to the pixels in the original image, and therefore, a data amount is small, and required storage space is small.

In some embodiments, the foregoing method further includes S104 of performing dynamic range extension on the extended dynamic range area in the original image to generate the extended dynamic range image corresponding to the original image. The dynamic range of the extended dynamic range image is greater than the dynamic range of the original image.

It should be understood that in this embodiment of this application, the thresholding segmentation result corresponding to the original image is obtained based on the brightness level information, and when dynamic range extension is performed on the original image, it may be determined, based on the thresholding segmentation result corresponding to the original image, whether the pixels in the original image correspond to the standard dynamic range area or the extended dynamic range area, and dynamic range extension is performed on the extended dynamic range area in the original image to obtain the extended dynamic range image corresponding to the original image, so that dynamic range extension to the original image is implemented, the dynamic range of the original image is larger, and the extended dynamic range image that has a larger dynamic range than the original image is obtained, thereby better reflecting gradients and levels in light and a color in the image and bringing a visual effect closer to that in the real world to the user.

Based on the method provided in this embodiment, an electronic device stores the original image and the thresholding segmentation result corresponding to the original image. Therefore, if the user views the original image on an electronic device that supports only display of a low dynamic range, the electronic device displays the original image to the user, and the original image is a low dynamic range LDR image or a standard dynamic range SDR image whose display is supported by the electronic device. However, if the user views the original image on an electronic device that supports display of a high dynamic range, the electronic device may perform the method in this embodiment to perform dynamic range extension on the extended dynamic range area in the original image, so that dynamic range extension to the original image is implemented, and therefore, the user can view the extended dynamic range image that corresponds to the original image and that has a visual effect closer to that in the real world.

For example, in an application scenario, a first electronic device and a second electronic device exist, the first electronic device supports only display of a low dynamic range, and the second electronic device supports display of a high dynamic range. In this scenario, the user opens a photographing application (Application, App) on the first electronic device, and photographs an image by using a camera in the first electronic device. Therefore, the first electronic device may obtain original image information, and may perform step S101~step S103 in the foregoing embodiment on the shot image, and associatively store the original image and a thresholding segmentation result corresponding to the original image. Then the user exits the photographing App on the first electronic device, opens an album on the first electronic device, and views the just shot image through tapping, and in this case, the first electronic device displays the corresponding original image to the user. If the user transmits the original image and the thresholding segmentation result corresponding to the original image to the second electronic device by using a communication App on the first electronic device, because the second electronic device supports display of a high dynamic range, the second electronic device may perform step S104 in the foregoing embodiment, to be specific, perform dynamic range extension on an extended dynamic range area in the original image based on the thresholding segmentation result corresponding to the original image, to obtain an extended dynamic range image corresponding to the original image. Therefore, when the user views a corresponding image by using the second electronic device, the second electronic device can display the corresponding extended dynamic range image to the user, to provide better visual experience for the user.

For another example, in another application scenario, although an electronic device supports display of a high dynamic range, an image captured by a camera of the electronic device has a quite limited dynamic range. For example, the captured image is an LDR image or an SDR image. In this scenario, the user opens a photographing App on the electronic device, and photographs an image by using the camera in the electronic device. Therefore, the electronic device may obtain original image information, perform step S101~step S103 in the foregoing embodiment on the shot image, and associatively store the original image and a thresholding segmentation result corresponding to the original image. Then the user exits the photographing App on the electronic device, opens an album on the electronic device, and views the just shot image through tapping. In this case, the electronic device may perform step S104 in the foregoing embodiment, and determine, based on the thresholding segmentation result corresponding to the original image, whether each pixel in the original image corresponds to a standard dynamic range area or an extended dynamic range area, so that dynamic range extension is performed on the extended dynamic range area in the original image to obtain an extended dynamic range image corresponding to the original image. In this way, the electronic device can display the corresponding extended dynamic range image to the user, to provide better visual experience for the user.

Figure 5:
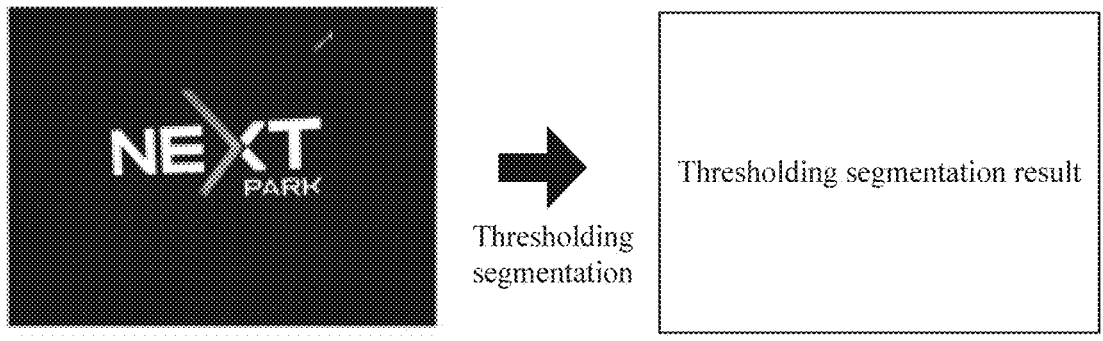
FIG. 5 is a schematic diagram of a thresholding segmentation effect according to an embodiment of this application.

In some embodiments, the brightness level information is an exposure image captured in a same scene as the original image. A photographed object in the exposure image is the same as a photographed object in the original image. A brightness value of each pixel in the exposure image indicates a brightness value of a corresponding pixel in the original image. The obtaining, based on the brightness level information included in the original image information and a brightness threshold, a thresholding segmentation result corresponding to the original image may be obtaining, based on the brightness value of each pixel in the exposure image and the brightness threshold, the thresholding segmentation result corresponding to the original image. A corresponding schematic diagram is shown in FIG. 5.

It should be understood that the exposure image may be an exposure image captured by the camera in a same scene as the original image at an exposure value, or may be a plurality of exposure images captured by the camera in a same scene as the original image at a plurality of different exposure values, or may be an exposure image obtained by combining the plurality of exposure images. When the thresholding segmentation result corresponding to the original image is obtained, an exposure image whose dynamic range is relatively ideal may be selected for thresholding segmentation, to obtain a corresponding thresholding segmentation result. In addition, the foregoing exposure image may be shot by one or more cameras. It should be noted that if necessary, the original image and the exposure image need to be registered, so that pixels in the two images are in a one-to-one correspondence, to be specific, pixels at same coordinates in the two images correspond to a same location in a real environment.

Figure 6:
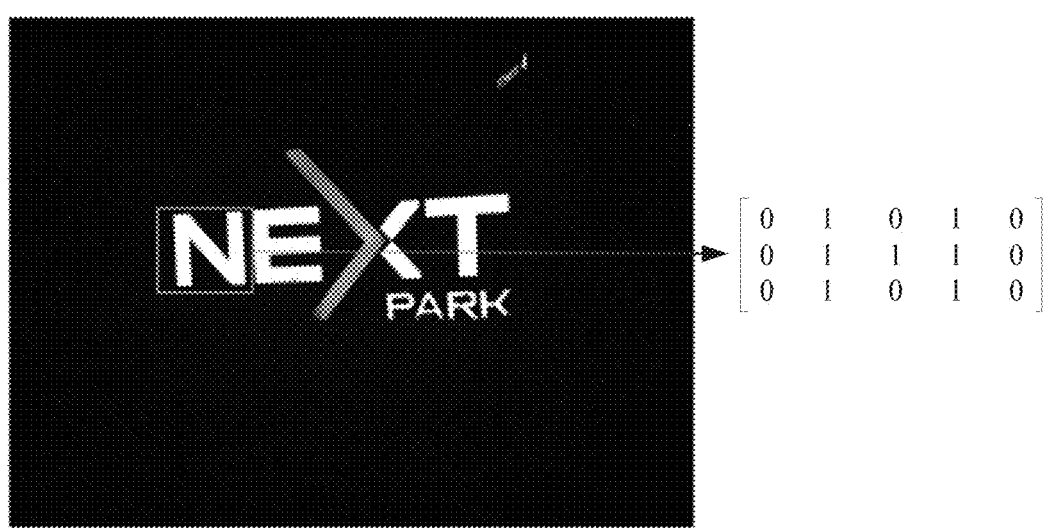
FIG. 6 is a schematic diagram of a thresholding segmentation result according to an embodiment of this application.

In some embodiments, for an exposure image in which targets are relatively undiversified, the following method may be used to obtain, based on the brightness level information included in the original image information and the brightness threshold, the thresholding segmentation result corresponding to the original image: Thresholding segmentation is performed on the exposure image based on the brightness value of each pixel in the exposure image by using a single-level thresholding (single-level thresholding) segmentation method, to obtain a thresholding segmentation result. The thresholding segmentation result includes area class labels corresponding to pixels in the original image, and areas corresponding to the pixels include a standard dynamic range area and an extended dynamic range area. Correspondingly, the thresholding segmentation result may be represented by a two-dimensional matrix shown in FIG. 6. Elements in the two-dimensional matrix have only two possible values, for example, 0 and 1, respectively corresponding to the standard dynamic range area and the extended dynamic range area. FIG. 6 is a schematic diagram of a thresholding segmentation result according to an embodiment of this application. As shown in FIG. 6, for pixel values of a letter "N" and a part around the letter "N" on the left side of the figure, a corresponding thresholding segmentation result may be represented as follows:

$$\begin{bmatrix} 0 & 1 & 0 & 1 & 0 \\ 0 & 1 & 1 & 1 & 0 \\ 0 & 1 & 0 & 1 & 0 \end{bmatrix}.$$

Alternatively, the thresholding segmentation result may be represented by a data sequence. In this case, for pixel values of a letter "N" and a part around the letter "N" on the left side of FIG. 6, a corresponding thresholding segmentation result may be represented as 010100111001010.

Figure 7:
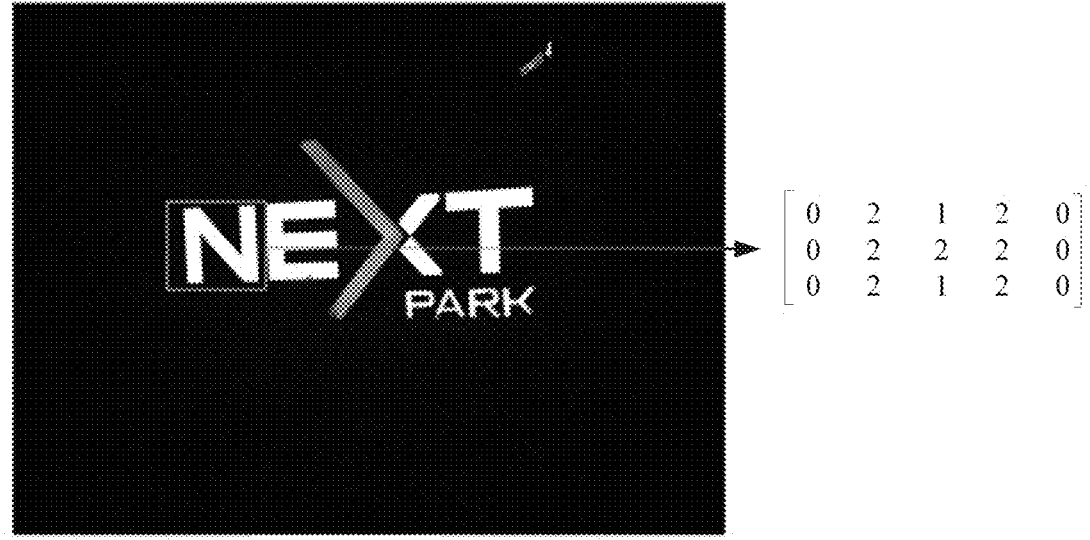
FIG. 7 is a schematic diagram of another thresholding segmentation result according to an embodiment of this application.

In some embodiments, for an exposure image in which targets are relatively complex, the following method may be used to obtain, based on the brightness level information included in the original image information and the brightness threshold, the thresholding segmentation result corresponding to the original image: Thresholding segmentation is performed on the exposure image based on the brightness value of each pixel in the exposure image by using a multi-level thresholding (multi-level thresholding) segmentation method, to obtain a thresholding segmentation result. The thresholding segmentation result includes area class labels corresponding to pixels in the original image. Area classes include a standard dynamic range area and an extended dynamic range area. The extended dynamic range area is further divided into a plurality of levels of dynamic range areas. It should be understood that for an image in which targets are relatively complex, thresholding segmentation is performed on the exposure image by using the multi-level threshold (multi-level thresholding) segmentation method, to obtain a thresholding segmentation result that includes a plurality of areas (one standard dynamic range area and a plurality of levels of extended dynamic range areas), so that a segmentation granularity is finer. For example, for an image that has K targets and backgrounds, K thresholds may be used for segmentation to obtain one standard dynamic range area and K levels of extended dynamic range areas. Subsequently, tone mapping may be correspondingly performed for different areas by using different levels of extension coefficients, to obtain an extended dynamic range image with richer brightness gradients and brightness levels. Correspondingly, the thresholding segmentation result may be represented by a two-dimensional matrix, and elements in the two-dimensional matrix have a plurality of possible values, separately corresponding to a plurality of areas. If the thresholding segmentation result includes one standard dynamic range area and two levels of extended dynamic range areas, elements in a corresponding two-dimensional matrix have three possible values, for example, 0, 1, and 2. FIG. 7 is a schematic diagram of a thresholding segmentation result according to an embodiment of this application. As shown in FIG. 7, for pixel values of a letter "N" and a part around the letter "N" on the left side of the figure, a corresponding thresholding segmentation result may be represented as follows:

$$\begin{bmatrix} 0 & 2 & 1 & 2 & 0 \\ 0 & 2 & 2 & 2 & 0 \\ 0 & 2 & 1 & 2 & 0 \end{bmatrix}.$$

Alternatively, the thresholding segmentation result may be represented by a data sequence. In this case, for pixel values of a letter "N" and a part around the letter "N" on the left side of FIG. 6, a corresponding thresholding segmentation result may be represented as 021200222002120.

For example, the foregoing threshold may be determined based on the brightness value of each pixel in the exposure image. Specifically, a corresponding brightness histogram is constructed based on the brightness value of each pixel in the exposure image. The brightness histogram may display quantities of pixels whose brightness values are 0, 1, . . . , and 255 in the exposure image. The brightness histogram includes an x-axis and a y-axis. Values on the x-axis represent brightness values, which are sequentially 0, 1, . . . and 255, in other words, represent pure black (a brightness value is 0) to pure white (a brightness value is 255) from left to right. Values on the y-axis represent quantities of pixels. The quantities of pixels whose brightness values are 0, 1, . . . , k . . . , and 255 in the exposure image, denoted as $y_0$, $y_1$, . . . , $y_k$, . . . , and $y_{255}$, are obtained based on the brightness histogram. $y_0$ is a quantity of pixels whose brightness values x are 0 in the exposure image, $y_1$ is a quantity of pixels whose brightness values x are 1 in the exposure image, $y_k$ is a quantity of pixels whose brightness values x are k in the exposure image, and $y_{255}$ is a quantity of pixels whose brightness values x are 255 in the exposure image. Corresponding quantities of pixels in the exposure image are added one by one in descending order of brightness values x, and a brightness value k is used as the threshold when a total quantity of pixels obtained when the addition reaches the quantity $y_k$ of pixels corresponding to the brightness value k is greater than a preset quantity. For example, the preset quantity may be 80% of a total quantity of pixels in the exposure image. For example, for an exposure image with a size of 100*100, where there are 10000 pixels in total, the preset quantity may be 800. Assuming that the quantities of pixels whose brightness values are 0, 1, . . . , k, . . . , and 255 in the exposure image are $y_0$, $y_1$, . . . , $y_k$, . . . , and $y_{255}$, corresponding quantities, $y_{255}$, $y_{254}$, and $y_{253}$, of pixels are added one by one in descending order of brightness values, and a brightness value 90 is used as the threshold when a total quantity of pixels obtained through addition when the addition reaches the quantity $y_{90}$ of pixels corresponding to the brightness value is greater than 800.

It should be understood that the method in this embodiment of this application is applicable to determining a threshold by using the single-level thresholding segmentation method, and is also applicable to determining a threshold by using the multi-level thresholding segmentation method. When the method is used to determine a threshold by using the single-level thresholding segmentation method, the preset quantity is set to one value, and a unique threshold is obtained, and is used for single-level thresholding segmentation. Therefore, two areas may be obtained through segmentation, and are separately used as the standard dynamic range area and the extended dynamic range area. When the method is used to determine a threshold by using the multi-level thresholding segmentation method, the preset quantity is set to a plurality of different values, and a plurality of brightness thresholds may be obtained, and are used for multi-level thresholding segmentation. Therefore, a plurality of areas may be obtained through segmentation. An area in which a brightness value is less than a minimum threshold $T_{min}$ is used as the standard dynamic range area, an area in which a brightness value is greater than or equal to the minimum threshold $T_{min}$ is used as the extended dynamic range area, and the extended dynamic range area is further divided into a plurality of areas by using a plurality of brightness thresholds. For example, in addition to the minimum threshold $T_{min}$, there are thresholds $T_1$, $T_2$, . . . , and $T_n$, and in this case, the extended dynamic range area may be further divided into n areas $D_1$, $D_2$, . . . , and $D_n$ based on brightness values L of pixels in the extended dynamic range area and criteria of $T_{min} \leq L < T_1$, $T_1 \leq L < T_2$, . . . , and $T_{n-1} \leq L < T_n$. If a brightness value (for example, L) of a pixel falls within a brightness value interval $[T_{min}, T_1)$, the pixel may be classified under the area $D_1$. If a brightness value (for example, L) of a pixel falls within a brightness value interval $[T_1, T_2)$, the pixel may be classified under the area $D_2$. If a brightness value (for example, L) of a pixel falls within a brightness value interval $[T_{n-1}, T_n)$. the pixel may be classified under the area $D_n$. During subsequent tone mapping, for $D_1, D_2 \ldots$, and $D_n$, corresponding extension coefficients may be separately calculated by using a same tone mapping function or different tone mapping functions, so that an extended dynamic range image with richer brightness gradients and brightness levels can be obtained.

For example, the foregoing threshold may be determined based on the brightness value of each pixel in the exposure image. Specifically, a corresponding brightness histogram is constructed based on the brightness value of each pixel in the exposure image. The brightness histogram may display quantities of pixels whose brightness values are 0, 1, . . . , and 255 in the exposure image. A threshold for performing thresholding segmentation on the exposure image is determined based on the brightness histogram by using OTSU.

In an example in which a single threshold is determined, a rule for determining a threshold by using OTSU is as follows: For a given threshold T, pixels in a to-be-segmented image are classified into foreground pixels and background pixels. A proportion of a quantity of foreground pixels to a total quantity of pixels in the to-be-segmented image is p1, an average brightness value of the foreground pixels is $b_1$, a proportion of a quantity of background pixels to the total quantity of pixels in the to-be-segmented image is $p_2$, and an average brightness value of the background pixels is $b_2$. An average brightness value of all the pixels in the to-be-segmented image is b, and $b = p_1 b_1 + p_2 b_2$. A variance of brightness values of all the pixels in the to-be-segmented image is $\sigma^2$, where $\sigma^2 = p_1(b_1-b)^2 + p_2(b_2-b)^2 = p_1 p_2 (b_1-b_2)^2$. All the brightness values are traversed, and a value that enables $\sigma^2$ to be a maximum is the threshold T.

OTSU is one of the most widely used image segmentation methods. The method is also referred to as a maximum inter-class method thresholding segmentation method. A criterion for selecting a segmentation threshold in the method is that an inter-class variance of an image reaches a maximum or an intra-class variance of the image is a minimum. It should be understood that OTSU may be extended from single-threshold segmentation to multi-threshold segmentation. In addition, an intelligent optimization algorithm may be used to search a plurality of thresholds to obtain an optimal threshold, so that the algorithm is greatly accelerated.

For example, the foregoing threshold may be determined based on the brightness value of each pixel in the exposure image. Specifically, an average value M and a standard deviation STD of brightness values of all pixels in the exposure image are calculated, and the threshold T for performing thresholding segmentation on the exposure image is calculated by using the following formula:

$$T = M + \beta \cdot STD$$

In the formula, $\beta$ is a variance coefficient.

It should be understood that the method in this embodiment of this application is applicable to determining a threshold by using the single-level thresholding segmentation method, and is also applicable to determining a threshold by using the multi-level thresholding segmentation method. When the method is used to determine a threshold by using the single-level thresholding segmentation method, the variance coefficient is set to one value, and one brightness threshold is obtained, and is used for single-level thresholding segmentation. Therefore, two areas may be obtained through segmentation, and are separately used as the standard dynamic range area and the extended dynamic range area. When the method is used to determine a threshold by using the multi-level thresholding segmentation method, the variance coefficient is set to a plurality of different values, and a plurality of different thresholds may be obtained, and are used for multi-level thresholding segmentation. Therefore, a plurality of areas may be obtained through segmentation. An area in which a brightness value is less than the minimum threshold is used as the standard dynamic range area, an area in which a brightness value is greater than or equal to the minimum threshold is used as the extended dynamic range area, and the extended dynamic range area is further divided into a plurality of areas, for example, $D_1$, $D_2$, . . . , and $D_n$, by using a plurality of brightness thresholds. During subsequent tone mapping, tone mapping is separately performed for $D_1$, $D_2 \ldots$, and $D_n$ by using different extension coefficients, so that an extended dynamic range image with richer brightness gradients and brightness levels can be obtained.

In some embodiments, the thresholding segmentation result is a data sequence. The area class labels corresponding to the pixels in the original image are represented by values of corresponding elements in the data sequence. The values of the elements in the data sequence include 0 and 1. A pixel that is in the original image and that corresponds to an element whose value is 0 in the data sequence corresponds to the standard dynamic range area. A pixel that is in the original image and that corresponds to an element whose value is 1 in the data sequence corresponds to the extended dynamic range area. The elements in the data sequence may be in a one-to-one correspondence with the pixels in the original image. For example, it is assumed that a size of the original image is H*W, where H and W respectively represent a height and a width of the original image, in other words, there are H pixels in a height direction of the original image, there are W pixels in a width direction of the original image, and a quantity of pixels included in the original image is H*W. Area class labels corresponding to the pixels in the original image are stored in a data sequence in a top-to-bottom and left-to-right order. Correspondingly, a quantity of elements in the data sequence may be H*W, and a value of the $(i*(H-1)+j)^{th}$ element in the data sequence represents an area class label corresponding to a pixel of the $i^{th}$ row and the $j^{th}$ column in the original image. i=1, 2, . . . , H, j=1, 2, . . . , W.

In some embodiments, the thresholding segmentation result is a two-dimensional matrix. The area class labels corresponding to the pixels in the original image are represented by values of corresponding elements in the two-dimensional matrix. The values of the elements in the two-dimensional matrix include 0 and 1. A pixel that is in the original image and that corresponds to an element whose value is 0 in the two-dimensional matrix corresponds to the standard dynamic range area. A pixel that is in the original image and that corresponds to an element whose value is 1 in the two-dimensional matrix corresponds to the extended dynamic range area. The elements in the two-dimensional matrix may be in a one-to-one correspondence with the pixels in the original image. For example, it is assumed that a size of the original image is H*W, where H and W respectively represent a height and a width of the original image, in other words, there are H pixels in a height direction of the original image, there are W pixels in a width direction of the original image, and a quantity of pixels included in the original image is H*W. Correspondingly, a size of the two-dimensional matrix may also be H*W, and a value of an element of the $i^{th}$ row and the $j^{th}$ column in the two-dimensional matrix represents an area class label corresponding to a pixel of the $i^{th}$ row and the $j^{th}$ column in the original image. i=1, 2, . . . , H, j=1, 2, . . . , W.

It should be understood that the single-level thresholding segmentation method may be used for an exposure image in which targets are relatively undiversified. Obtained area classes are only a standard dynamic range area and an extended dynamic range area, and corresponding area class labels have only two values. Therefore, an obtained thresholding segmentation result may be represented by a data sequence or a two-dimensional matrix, so that storage space occupied by the thresholding segmentation result can be reduced.

In some embodiments, before the original image and the thresholding segmentation result corresponding to the original image are associatively stored, the method further includes: performing downsampling processing on the thresholding segmentation result corresponding to the original image. Assuming that the thresholding segmentation result corresponding to the original image is I, a thresholding segmentation result I' is obtained after downsampling processing is performed on the thresholding segmentation result I. Further, the associatively storing the original image and the thresholding segmentation result corresponding to the original image includes: associatively storing the original image and the downsampled thresholding segmentation result I' corresponding to the original image.

It should be understood that performing downsampling processing on the thresholding segmentation result corresponding to the original image can effectively reduce a data size of the thresholding segmentation result. Performing storage after downsampling processing is performed on the thresholding segmentation result corresponding to the original image can reduce storage space occupied by the thresholding segmentation result. In addition, the downsampled thresholding segmentation result may be restored to a same size as the original image through upsampling when being subsequently used to perform dynamic range extension on the original image, to determine an extension coefficient corresponding to each pixel in the original image.

In an example in which the thresholding segmentation result is a two-dimensional matrix, for example, the performing downsampling processing on the thresholding segmentation result I corresponding to the original image includes: performing downsampling processing on the thresholding segmentation result by using a sampling unit. For example, downsampling processing may be performed on the thresholding segmentation result I by using a sampling unit with a size of 2*2, 3*3, 4*4, or the like, so that a size of the downsampled thresholding segmentation result I is ¼, ⅑, 1/16, or another proportion of a size of the thresholding segmentation result. Performing downsampling processing on the thresholding segmentation result I by using a sampling unit with the size of 2*2 means that 2*2 elements in the thresholding segmentation result I are represented by one element in the corresponding thresholding segmentation result I', and a value of the element in the thresholding segmentation result I' may be an average value of values of the corresponding 2*2 elements in the thresholding segmentation result I, or may be a value of any element in the corresponding 2*2 elements in the thresholding segmentation result I. Performing downsampling processing on the thresholding segmentation result I by using a sampling unit with the size of 3*3 means that 3*3 elements in the thresholding segmentation result I are represented by one element in the corresponding thresholding segmentation result I', and a value of the element in the thresholding segmentation result I' may be an average value of values of the corresponding 3*3 elements in the thresholding segmentation result I, or may be a value of any element in the corresponding 3*3 elements in the thresholding segmentation result I. Performing downsampling processing on the thresholding segmentation result I by using a sampling unit with the size of 4*4 means that 4*4 elements in the thresholding segmentation result I are represented by one element in the corresponding thresholding segmentation result I', and a value of the element in the thresholding segmentation result I' may be an average value of values of the corresponding 4*4 elements in the thresholding segmentation result I, or may be a value of any element in the corresponding 4*4 elements in the thresholding segmentation result I. Processes of performing downsampling processing on the thresholding segmentation result by using sampling units with other sizes are analogous, and are not listed one by one herein. It should be understood that the foregoing embodiment merely provides example descriptions of a manner of performing downsampling processing on the thresholding segmentation result corresponding to the original image and a size of the thresholding segmentation result. The example descriptions do not constitute a limitation on the manner of performing downsampling processing on the thresholding segmentation result corresponding to the original image and the size of the thresholding segmentation result in this application. In this application, downsampling processing may alternatively be performed, in another manner, on the thresholding segmentation result corresponding to the original image, and the thresholding segmentation result may alternatively have another size. This is not specifically limited in this application. If the thresholding segmentation result is a data sequence, a corresponding binary matrix may also be obtained through expansion based on a correspondence between elements in the thresholding segmentation result and pixels in the original image, then downsampling processing may be performed by using the foregoing method, and then storage may be performed.

Corresponding to the foregoing embodiment, if the downsampled thresholding segmentation result I' corresponding to the original image is stored associatively with the original image, the following method is used to perform dynamic range extension on the extended dynamic range area in the original image based on the thresholding segmentation result corresponding to the original image, to obtain the extended dynamic range image: Upsampling processing is performed on the thresholding segmentation result I' to obtain a thresholding segmentation result I", and dynamic range extension is performed on the extended dynamic range area in the original image based on the upsampled thresholding segmentation result I", to obtain the extended dynamic range image.

It should be understood that a quantity of elements included in the thresholding segmentation result I" obtained after upsampling processing is performed on the downsampled thresholding segmentation result I' corresponding to the original image is the same as a quantity of pixels included in the original image, and the elements in the thresholding segmentation result I″ are in a one-to-one correspondence with the pixels in the original image. In this way, an extension coefficient corresponding to each pixel in the original image may be determined by using the thresholding segmentation result, so that dynamic extension is performed on the original image. For example, the thresholding segmentation result is a two-dimensional matrix. For example, it is assumed that a size of the original image is H*W, where H and W respectively represent a height and a width of the original image, in other words, there are H pixels in a height direction of the original image, there are W pixels in a width direction of the original image, and the quantity of pixels in the original image is H*W. A size of the corresponding downsampled thresholding segmentation result I′ is H′*W′, where H′ and W′ respectively represent a quantity of rows and a quantity of columns of the thresholding segmentation result I′, in other words, the thresholding segmentation result I′ includes H′ rows, the thresholding segmentation result I′ includes W′ columns, and a quantity included in the thresholding segmentation result I′ is H′*W′. H′<H and W′<W. In this way, space occupied by the thresholding segmentation result can be reduced when the thresholding segmentation result is stored. When dynamic range extension is being performed on the original image, upsampling processing may be first performed on the thresholding segmentation result I′, so that a size of the upsampled thresholding segmentation result I″ is restored to H*W, in other words, the thresholding segmentation result I″ includes H rows and W columns, and a quantity of elements included in the thresholding segmentation result I″ is H*W. In this way, the thresholding segmentation result I″ has a same size as the original image, and the pixels in the thresholding segmentation result I″ are in a one-to-one correspondence with the pixels in the original image, and therefore, the extension coefficient corresponding to each pixel in the original image may be determined by using the thresholding segmentation result I″, so that dynamic extension is performed on the original image.

In some embodiments, when the original image and the thresholding segmentation result corresponding to the original image are associatively stored, the original image and the thresholding segmentation result corresponding to the original image may be associatively stored in common image formats such as a portable network graphics (Portable Network Graphics, PNG) format and a joint photographic experts group (Joint Photographic Experts Group, JPEG) format. For these image formats, the original image and the thresholding segmentation result corresponding to the original image may be stored in one file according to corresponding encoding rules (encoding rules for files in the PNG format and the JPEG format) of the image formats. In addition, when the original image and the thresholding segmentation result corresponding to the original image needs to be separated, the original image and the thresholding segmentation result corresponding to the original image may be separated by using corresponding decoding rules (decoding rules for the files in the PNG format and the JPEG format).

According to the foregoing manner of storing the original image and the thresholding segmentation result corresponding to the original image provided in the foregoing embodiment, the original image and the thresholding segmentation result corresponding to the original image may be stored in a same file, so that when tone mapping (dynamic range extension) is being performed on the original image, the thresholding segmentation result corresponding to the original image can be efficiently found, and therefore, an extension coefficient for performing tone mapping on the original image can be quickly determined based on the thresholding segmentation result, and dynamic range extension to the original image can be quickly implemented, thereby ensuring real-time image processing.

Referring to FIG. 8, an embodiment of this application further provides a method for extending a dynamic range of an image, including the following steps.

S201: Obtain an original image and a thresholding segmentation result corresponding to the original image, where the thresholding segmentation result includes area class labels corresponding to pixels in the original image, areas corresponding to the pixels include an extended dynamic range area and a standard dynamic range area, a brightness value of a pixel in the extended dynamic range area is greater than or equal to a brightness threshold, and a brightness value of a pixel in the standard dynamic range area is less than the brightness threshold.

S202: Perform dynamic range extension on the extended dynamic range area in the original image based on the thresholding segmentation result corresponding to the original image, to obtain an extended dynamic range image, where a dynamic range of the extended dynamic range image is greater than a dynamic range of the original image.

It should be understood that in this embodiment of this application, dynamic range extension is performed on the extended dynamic range area in the original image based on an area to which the pixel in the original image belongs, in other words, depending on whether the pixel in the original image corresponds to the standard dynamic range area or the extended dynamic range area, so that dynamic range extension to the original image can be implemented, a dynamic range of the original image is larger, and the extended dynamic range image that has a larger dynamic range than the original image is obtained, thereby better reflecting gradients and levels in light and a color in the image and bringing a visual effect closer to that in a real world to a user.

It should be noted that based on the method provided in this embodiment, if the user views the original image on an electronic device that supports only display of a low dynamic range, the user views the original image, and the original image is a low dynamic range LDR image or a standard dynamic range SDR image: or if the user views the original image on an electronic device that supports display of a high dynamic range, the user can view the extended dynamic range image corresponding to the original image. Therefore, the method provided in this embodiment of this application is highly applicable. The electronic device that supports only display of a low dynamic range can display a quasi-dynamic range image whose display is supported by the electronic device. The electronic device that supports display of a high dynamic range can display the extended dynamic range image that has a larger dynamic range and whose display is supported by the electronic device, and therefore, a display effect is closer to a visual effect in a real environment, and user experience is better.

Figure 9:
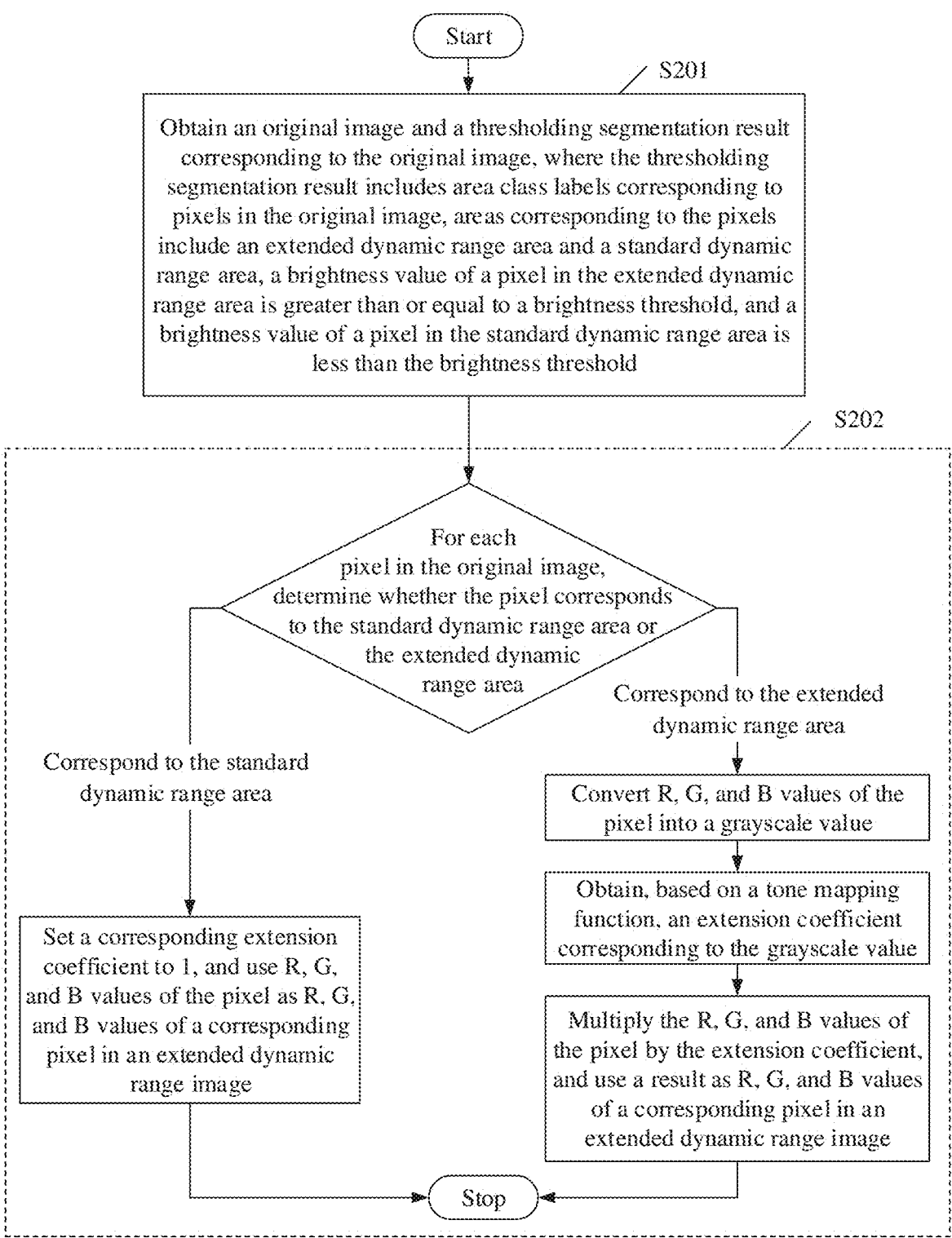
FIG. 9 is a flowchart of another method for extending a dynamic range of an image according to an embodiment of this application.
Figure 10:
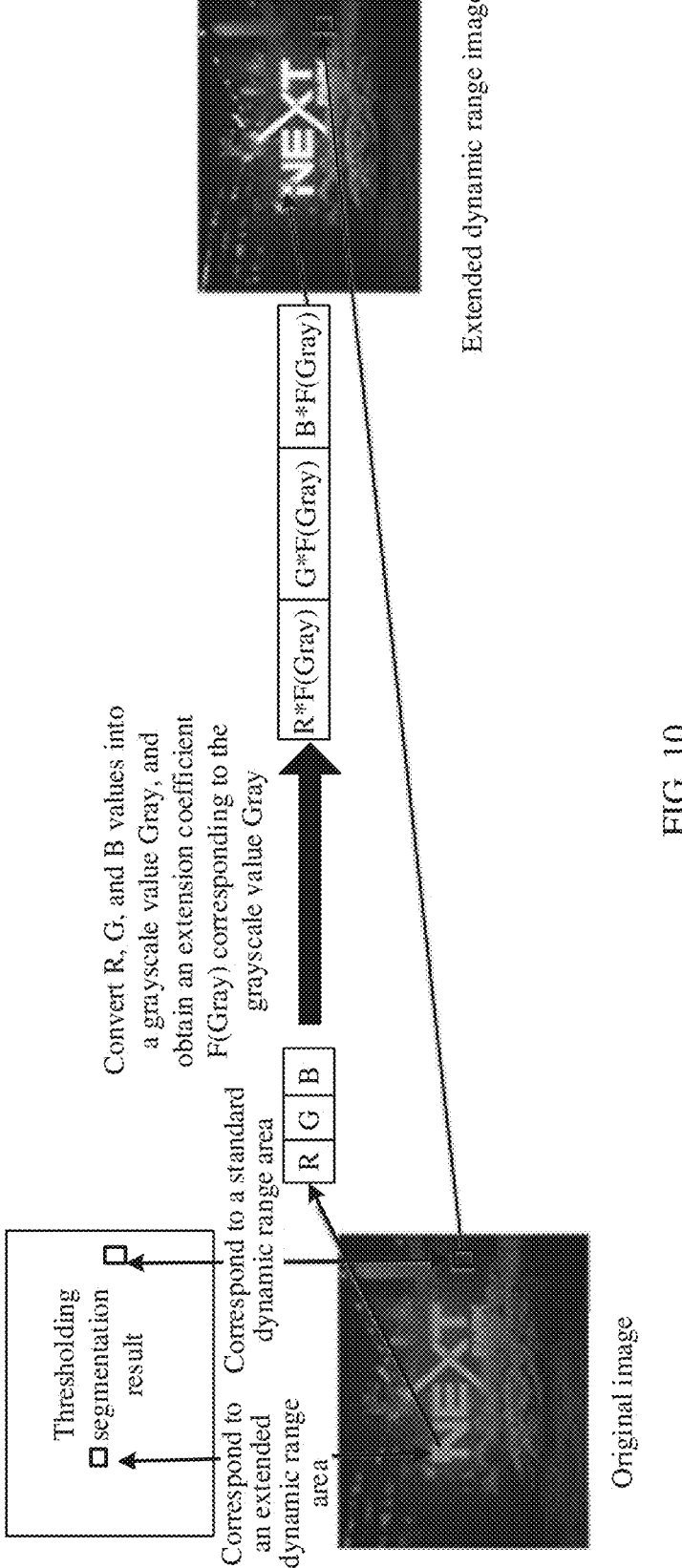
FIG. 10 is an effect diagram of another method for extending a dynamic range of an image according to an embodiment of this application.

In some embodiments, the performing dynamic range extension on the extended dynamic range area in the original image based on the thresholding segmentation result corresponding to the original image, to obtain an extended dynamic range image is specifically: determining, based on the thresholding segmentation result corresponding to the original image, whether each pixel in the original image corresponds to the standard dynamic range area or the extended dynamic range area, so that tone mapping can be performed on R, G, and B values of each pixel in the original image, to obtain the extended dynamic range image corresponding to the original image, including:

referring to FIG. 9 and FIG. 10, for each pixel P in the original image, determining, based on the area class labels that correspond to the pixels in the original image and that are included in the thresholding segmentation result corresponding to the original image, whether the pixel P corresponds to the standard dynamic range area or the extended dynamic range area. For example, the thresholding segmentation result corresponding to the original image is represented by a data sequence, a pixel that is in the original image and that corresponds to an element whose value is 0 in the data sequence corresponds to the standard dynamic range area, and a pixel that is in the original image and that corresponds to an element whose value is 1 in the data sequence corresponds to the extended dynamic range area. In this case, if a value of an element that is in the data sequence and that corresponds to the pixel P is 0, the pixel P corresponds to the standard dynamic range area: or if a value of an element that is in the data sequence and that corresponds to the pixel P is 1, the pixel P corresponds to the extended dynamic range area.

After it is determined whether the pixel P corresponds to the standard dynamic range area or the extended dynamic range area, tone mapping is performed on R, G, and B values of the pixel P by using corresponding extension coefficients, to obtain R, G, and B values of a pixel P' that is in the extended dynamic range image and that corresponds to the pixel P. Specifically, if the pixel P corresponds to the standard dynamic range area, an extension coefficient $\alpha_P$ corresponding to the pixel P is equal to 1, and R, G, and B values of the pixel P are directly used as the R, G, and B values of the pixel P' that is in the extended dynamic range image and that corresponds to the pixel P; or if the pixel P corresponds to the extended dynamic range area, an extension coefficient $\alpha_P$ corresponding to the pixel P is greater than or equal to 1, R, G, and B values of the pixel P are multiplied by the extension coefficient $\alpha_P$ to obtain new R, G, and B values, and the new R, G, and B values are used as the R, G, and B values of the pixel P' that is in the extended dynamic range image and that corresponds to the pixel P.

In some embodiments, that if the pixel P corresponds to the extended dynamic range area, an extension coefficient $\alpha_P$ corresponding to the pixel is greater than or equal to 1 includes:

if the pixel P corresponds to the extended dynamic range area, converting the R, G, and B values of the pixel P into a grayscale value Gray;

obtaining, based on a tone mapping function F(x), a Gray tone mapping function value F(Gray) corresponding to the grayscale value, where the tone mapping function F(x) is a monotonically non-decreasing function, and F(x)≥1; and using the tone mapping function value F(Gray) as the extension coefficient $\alpha_P$ corresponding to the pixel.

Figure 12:
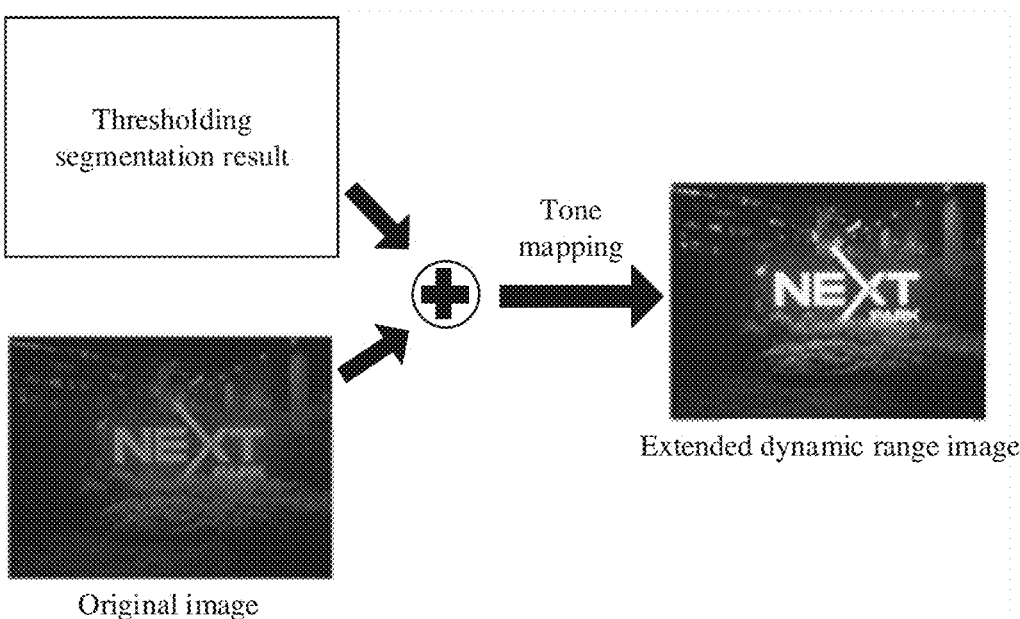
FIG. 12 is an effect diagram of a method for extending a dynamic range of an image according to an embodiment of this application.

It should be understood that according to the method provided in this embodiment, for pixels in the standard dynamic range area and the extended dynamic range area, mapping is performed on R, G, and B values of the pixels P by using corresponding extension coefficients, to obtain R, G, and B values of pixels P' that are in the extended dynamic range image and that correspond to the pixels P. For a pixel corresponding to the standard dynamic range area, a corresponding extension coefficient is set to 1, in other words, R, G, and B values of the pixel remain unchanged, and the pixel is not brightened. In other words, a brightness value of a pixel that is in the original image and that corresponds to a low-brightness area remains unchanged. For a pixel corresponding to the extended dynamic range area, R. G, and B values of the pixel are multiplied by an extension coefficient to obtain new R, G, and B values. In other words, a pixel that is in the original image and that corresponds to a high-brightness area is brightened through tone mapping. A dynamic range of an image is a ratio of a maximum brightness value to a minimum brightness value of pixels in the image, namely, the maximum brightness value of the pixels in the image/the minimum brightness value of the pixels in the image. After the pixel in the high-brightness area is brightened, the maximum brightness value in the image increases, and therefore, a dynamic range of the image increases, so that dynamic range extension to the image can be implemented. In addition, in the solution, the pixel that is in the original image and that corresponds to the low-brightness area is not brightened, so that a data amount of image processing can be reduced, thereby accelerating dynamic range extension to the image and improving real-time performance. In addition, it should be noted that in this embodiment of this application, the thresholding segmentation result corresponding to the original image is divided into the standard dynamic range area and the extended dynamic range area. Division of different areas reflects brightness information of the different areas of the original image, and an area corresponding to a pixel in the original image reflects a brightness value of the pixel in the original image. Therefore, according to the method provided in this embodiment of this application, as shown in FIG. 12, tone mapping is actually performed on a pixel in the original image with reference to a brightness value and R, G, and B values of the pixel in the original image, to implement dynamic range extension to the original image. Compared with tone mapping performed by using only the brightness value or the R, G, and B values of the pixel in the original image, the method uses richer information, and achieves a better effect of dynamic range extension. For example, for an original image whose background is white paper or a white wall, if an extension coefficient is determined, for tone mapping, based on only a brightness value or R, G, and B values of a pixel in the original image, because a brightness value or R, G, and B values of a pixel corresponding to a white paper or the white wall background are relatively large, and an extension coefficient corresponding to the part during tone mapping is also larger, brightening the area based on the extension coefficient causes brightness of a white paper or white wall background in an image obtained after tone mapping to be excessively high, which does not conform to a visual effect in a real environment. However, according to the method provided in this embodiment of this application, the standard dynamic range area and the extended dynamic range area in the image are obtained through division by using brightness level information. If brightness of a white paper or white wall background in the real environment is relatively low, the white paper or white wall background in the original image is classified under the standard dynamic range area, and therefore, may not be brightened during subsequent tone mapping, so that the brightness of the white paper or white wall background in the image obtained after tone mapping better conforms to the visual effect in the real environment.

For example, R. G, and B values of a corresponding pixel in the original image may be converted into grayscale value Gray by using the following formula: Gray=R*0.299+ G*0.587+B*0.114.

For example, R, G, and B values of a corresponding pixel in the original image may alternatively be converted into a grayscale value Gray by using the following formula: Gray= (R+G+B)/3.

Based on the foregoing embodiment, when a thresholding segmentation result is obtained based on brightness information of an exposure image, the exposure image is preferably a short-exposure image (an underexposed image) or a medium-exposure image (a normally exposed image). Because brightness of the short-exposure image or the medium-exposure image is relatively suitable, especially information on a relatively bright part of the image is not lost, better color gradients and levels can be obtained when pixels in the extended dynamic range area in the original image are subsequently brightened. Because in the solution provided in this embodiment of this application, a pixel in the standard dynamic range area in the original image is not brightened, and a pixel value of the pixel remains unchanged. Therefore, even if information on a relatively dark part of the short-exposure image or the medium-exposure image is lost, an effect of dynamic range extension in the solution provided in this embodiment of this application is not affected. Brightness of a long-exposure image (an overexposed image) is excessively high, and information on a relatively bright part of the image is lost. If the solution provided in this embodiment of this application is implemented based on the long-exposure image, an effect of dynamic range extension is not as ideal as the effect of dynamic range extension performed based on the short-exposure image or the medium-exposure image.

Figure 11:
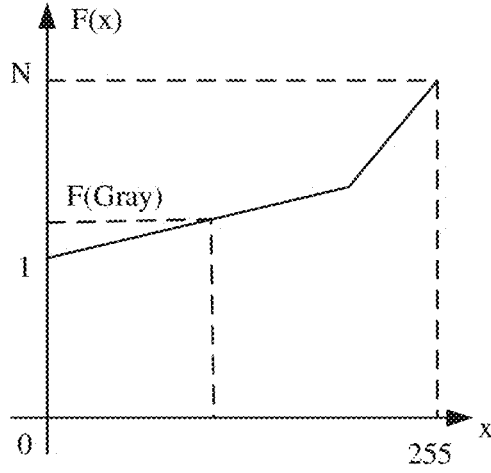
FIG. 11 is a curve diagram of a tone mapping function according to an embodiment of this application.

For example, referring to FIG. 11, the tone mapping function F(x) is a monotonically non-decreasing function, a range of the tone mapping function F(x) is 1~N, and a domain of the tone mapping function F(x) is 0~255.

For example, if in the foregoing embodiment, single-level thresholding segmentation is sampled, and only one extended dynamic range area is obtained, during dynamic range extension, for each pixel P in the extended dynamic range area, a grayscale value Gray of the pixel P is input to the tone mapping function F(x) to obtain an extension coefficient F(Gray) corresponding to the pixel, where a value range of F(Gray) is 1~N. and R, G, and B values of the pixel Pare multiplied by the extension coefficient F(Gray), so that dynamic range extension to the extended dynamic range area can be implemented to obtain an extended dynamic range image. Assuming that a dynamic range supported by a display is N times the dynamic range of the original image, and after the foregoing operations, a maximum brightness value of pixels in the extended dynamic range image can be increased to N times of a maximum brightness value of the pixels in the original image, a dynamic range of the extended dynamic range image can be increased to N times of the dynamic range of the original image, in other words, mapped to the dynamic range supported by the display, so that display performance of the display can be fully utilized, and a visual effect that is as close as possible to that in a real environment can be brought to the user.

For example, if in the foregoing embodiment, multi-level thresholding segmentation is sampled, and a plurality of extended dynamic range areas such as $D_1$, $D_2$, . . . , $D_n$ are obtained, during dynamic range extension, corresponding extension coefficients may be calculated for pixels in all levels of extended dynamic range areas by using a same tone mapping function or different tone mapping functions. For example, for each pixel $P_1$ in the first level of extended dynamic range area $D_1$, a grayscale value Gray: of the pixel $P_1$ is input to a first tone mapping function $F_1(X)$ to obtain an extension coefficient $F_1(Gray_1)$ corresponding to the pixel P. A value range of $F_1(Gray_1)$ is 1~$N_1$. R, G, and B values of the pixel P are multiplied by $F_1(Gray_1)$, so that a brightness value of the pixel in the first level of extended dynamic range area $D_1$ can be increased by a maximum of $N_1$ times. For each pixel $P_2$ in the second level of extended dynamic range area $D_2$, a grayscale value $Gray_2$ of the pixel $P_2$ is input to a second tone mapping function $F_2(X)$ to obtain an extension coefficient $F_2(Gray_2)$ corresponding to the pixel $P_2$. A value range of $F_2(Gray_2)$ is $N_1$~$N_2$. R, G, and B values of the pixel $P_2$ are multiplied by $F_2(Gray_2)$, so that a brightness value of the pixel in the second level of extended dynamic range area $D_2$ can be increased by a maximum of N2 times. By analogy, for each pixel $P_n$ in the nth level of extended dynamic range area $D_n$, a grayscale value $Gray_n$ of the pixel $P_n$ is input to a tone mapping function $F_n(x)$ to obtain an extension coefficient $F_n(Gray_n)$ corresponding to the pixel $P_n$. A value range of $F_n(Gray_n)$ is $N_{n-1}$~$N_n$. R, G, and B values of the pixel $P_n$ are multiplied by the extension coefficient $F_n(Gray_n)$, so that a maximum brightness value of the pixel in the nth level of extended dynamic range area $D_n$ may be increased by Na times. $N_n \geq N_{n-1} \geq \ldots \geq N_2 \geq N_1 \geq 1$. In this way, dynamic range extension to all the levels of extended dynamic range areas can be implemented to obtain a final extended dynamic range image. Assuming that a dynamic range supported by a display is $N_n$ times the dynamic range of the original image, and after the foregoing operations, a maximum brightness value of a pixel in the final extended dynamic range image can be increased to $N_n$ times of a maximum brightness value of the pixels in the original image, a dynamic range of the extended dynamic range image can be increased to $N_n$ times of the dynamic range of the original image, in other words, mapped to the dynamic range supported by the display, so that display performance of the display can be fully utilized, and a visual effect that is as close as possible to that in a real environment can be brought to the user.

An embodiment of this application further provides an apparatus for extending a dynamic range of an image, including:

an original image information obtaining module, configured to obtain original image information, where the original image information includes an original image and brightness level information, and the brightness level information is used to indicate a brightness value of a pixel in the original image;

a thresholding segmentation module, configured to obtain, based on the brightness level information included in the original image information and a brightness threshold, a thresholding segmentation result corresponding to the original image, where the thresholding segmentation result includes area class labels corresponding to pixels in the original image, areas corresponding to the pixels include an extended dynamic range area and a standard dynamic range area, a brightness value corresponding to a pixel in the extended dynamic range area is greater than or equal to the brightness threshold, and a brightness value corresponding to a pixel in the standard dynamic range area is less than the brightness threshold, where when dynamic range extension is performed on the original image, dynamic range extension may be performed on the extended dynamic range area in the original image based on the thresholding segmentation result corresponding to the original image, to obtain an extended dynamic range image corresponding to the original image, where a dynamic range of the extended dynamic range image is greater than a dynamic range of the original image; and a storage module, configured to associatively store the original image and the thresholding segmentation result corresponding to the original image.

An embodiment of this application further provides another apparatus for extending a dynamic range of an image, including:

a data obtaining module, configured to obtain an original image and a thresholding segmentation result corresponding to the original image, where the thresholding segmentation result includes area class labels corresponding to pixels in the original image, areas include an extended dynamic range area and a standard dynamic range area, a brightness value of a pixel in the standard dynamic range area is less than the brightness threshold, and a brightness value of a pixel in the extended dynamic range area is greater than or equal to the brightness threshold; and a dynamic range extension module, configured to perform dynamic range extension on the extended dynamic range area in the original image based on the thresholding segmentation result corresponding to the original image, to generate an extended dynamic range image corresponding to the original image, where a dynamic range of the extended dynamic range image is greater than a dynamic range of the original image.

It should be understood that the foregoing apparatus embodiments have a function of implementing the foregoing method embodiments. The function may be implemented by hardware, or may be implemented by hardware by executing corresponding software. The hardware or software includes one or more modules corresponding to the function.

An embodiment of this application further provides an electronic device. The electronic device includes a memory and one or more processors. The memory is coupled to the processor. The memory stores computer program code, the computer program code includes computer instructions, and when the computer instructions are executed by the processor, the electronic device is enabled to perform the functions or the steps performed by the mobile phone in the foregoing method embodiments. For a structure of the electronic device, refer to the structure of the electronic device 300 shown in FIG. 3.

In some embodiments, the electronic device includes one or more cameras, and the cameras are configured to collect original image information.

In some embodiments, the electronic device includes a communication module, and the communication module is configured to perform data transmission with another device to obtain an original image and a thresholding segmentation result corresponding to the original image.

Figure 13:
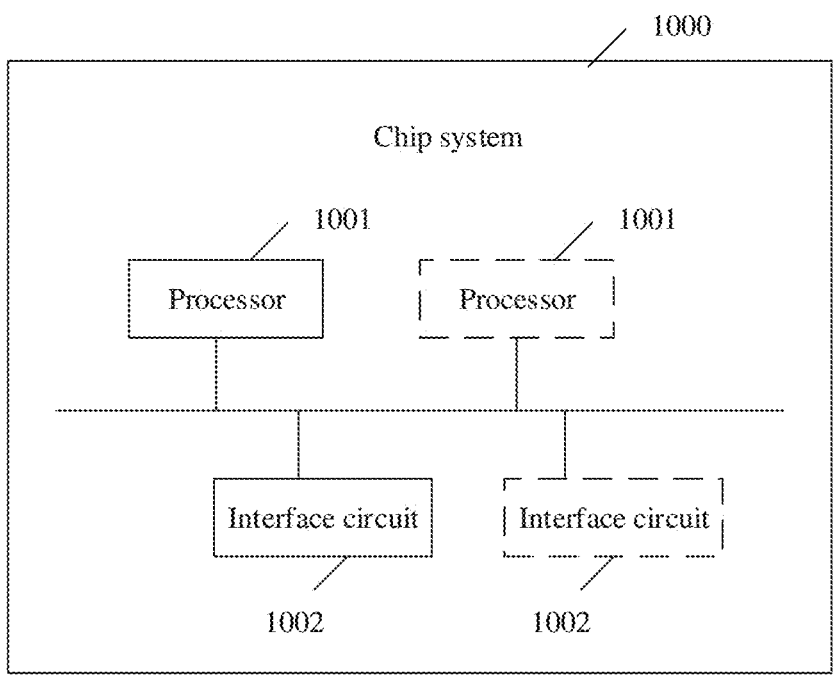
FIG. 13 is a schematic diagram of a structure of a chip system according to an embodiment of this application.

An embodiment of this application further provides a chip system. As shown in FIG. 13, the chip system 1000 includes at least one processor 1001 and at least one interface circuit 1002.

The processor 1001 and the interface circuit 1002 may be interconnected through a line. For example, the interface circuit 1002 may be configured to receive a signal from another apparatus (for example, a memory of an electronic device). For another example, the interface circuit 1002 may be configured to send a signal to another apparatus (for example, the processor 1001). For example, the interface circuit 1002 may read instructions stored in the memory, and send the instructions to the processor 1001. When the instructions are executed by the processor 1001, the electronic device is enabled to perform the functions or the steps performed by a mobile phone 100 in the foregoing method embodiments. Certainly, the chip system may further include another discrete component. This is not specifically limited in this embodiment of this application.

An embodiment of this application further provides a computer storage medium. The computer storage medium includes computer instructions, and when the computer instructions run on the foregoing electronic device, the electronic device is enabled to perform the functions or the steps performed by the mobile phone in the foregoing method embodiments.

An embodiment of this application further provides a computer program product. When the computer program product runs on a computer, the computer is enabled to perform the functions or the steps performed by the mobile phone in the foregoing method embodiments. For example, the computer may be the foregoing mobile phone.

Through the descriptions of the foregoing implementations, a person skilled in the art can clearly understand that for the purpose of convenient and brief description, only division of the foregoing functional modules is used as an example for description. In actual application, the functions may be allocated to and completed by different functional modules as required. In other words, an internal structure of the apparatus is divided into different functional modules, to complete all or some of the functions described above. For a specific working process of the system, apparatus, and unit described above, refer to a corresponding process in the foregoing method embodiments. Details are not described herein again.

In embodiments of this application, functional units in the embodiments may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of embodiments of this application essentially, or the part contributing to the conventional technology, or all or some of the technical solutions may be implemented in the form of a software product. The computer software product is stored in a storage medium and includes several instructions for instructing a computer device (which may be a personal computer, a server, a network device, or the like) or a processor to perform all or some of the steps of the methods described in embodiments of this application. The foregoing storage medium includes any medium that can store program code, such as a flash memory, a removable hard disk, a read-only memory, a random access memory, a magnetic disk, or an optical disc.

The foregoing descriptions are merely specific implementations of embodiments of this application, but the protection scope of embodiments of this application is not limited thereto. Any variation or replacement within the technical scope disclosed in embodiments of this application shall fall within the protection scope of embodiments of this application. Therefore, the protection scope of embodiments of this application shall be subject to the protection scope of the claims.

What is claimed is:

1. A method for extending a dynamic range of an image, comprising:

obtaining original image information, wherein the original image information comprises an original image and brightness level information, and the brightness level information is used to indicate a brightness value of a pixel in the original image;

obtaining, based on the brightness level information and a brightness threshold, a thresholding segmentation result corresponding to the original image, wherein the thresholding segmentation result corresponding to the original image comprises area class labels corresponding to pixels in the original image, the area class labels are used to indicate classes of areas corresponding to the pixels in the original image, the areas comprise a standard dynamic range area and an extended dynamic range area, a brightness value of a pixel in the standard dynamic range area is less than the brightness threshold, and a brightness value of a pixel in the extended dynamic range area is greater than or equal to the brightness threshold; and associatively storing the original image and the thresholding segmentation result corresponding to the original image, for subsequently performing dynamic range extension on the extended dynamic range area in the original image based on the thresholding segmentation result corresponding to the original image, to generate an extended dynamic range image corresponding to the original image, wherein a dynamic range of the extended dynamic range image is greater than a dynamic range of the original image, wherein the brightness level information is an exposure image captured in a same scene as the original image, and a photographed object in the exposure image is the same as a photographed object in the original image;

a brightness value of each pixel in the exposure image indicates a brightness value of a corresponding pixel in the original image; and the obtaining of the thresholding segmentation result corresponding to the original image comprises obtaining, based on the brightness value of each pixel in the exposure image and the brightness threshold, the thresholding segmentation result corresponding to the original image, and wherein the method further comprises:

constructing a corresponding brightness histogram based on the brightness value of each pixel in the exposure image, wherein the brightness histogram is used to display quantities of pixels whose brightness values are 0, 1, . . . , and 255 in the exposure image, the brightness histogram comprises an x-axis and a y-axis, values on the x-axis represent brightness values, which are sequentially 0, 1, . . . , and 255, and values on the y-axis represent quantities of pixels;

obtaining, based on the brightness histogram, the quantities of pixels whose brightness values are 0, 1, . . . , k, . . . , and 255 in the exposure image, denoted as $y_0$, $y_1$, . . . , $y_k$, . . . , and $y_{255}$, wherein $y_0$ is a quantity of pixels whose brightness values x are 0 in the exposure image, $y_1$ is a quantity of pixels whose brightness values x are 1 in the exposure image, $y_k$ is a quantity of pixels whose brightness values x are k in the exposure image, and $y_{255}$ is a quantity of pixels whose brightness values x are 255 in the exposure image; and adding corresponding quantities of pixels one by one in descending order of brightness values x, and using a brightness value k as the brightness threshold when a total quantity of pixels obtained when the addition reaches the quantity $y_k$ of pixels corresponding to the brightness value k is greater than a preset quantity.

2. The method according to claim 1, wherein the obtaining, based on the brightness value of each pixel in the exposure image and the brightness threshold, the thresholding segmentation result corresponding to the original image comprises:

determining one brightness threshold based on the brightness value of each pixel in the exposure image, and performing single-level thresholding segmentation on the exposure image based on the one brightness threshold to obtain a thresholding segmentation result corresponding to the original image, wherein the thresholding segmentation result corresponding to the original image comprises area class labels corresponding to pixels in the original image, the area class labels are used to indicate classes of areas corresponding to the pixels in the original image, and the areas comprise one standard dynamic range area and one extended dynamic range area.

3. The method according to claim 1, wherein the obtaining, based on the brightness value of each pixel in the exposure image and the brightness threshold, the thresholding segmentation result corresponding to the original image comprises:

determining a plurality of brightness thresholds based on the brightness value of each pixel in the exposure image, and performing multi-level thresholding segmentation on the exposure image based on the plurality of brightness thresholds to obtain a thresholding segmentation result corresponding to the original image, wherein the thresholding segmentation result corresponding to the original image comprises area class labels corresponding to pixels in the original image, the area class labels are used to indicate classes of areas corresponding to the pixels in the original image, and the areas comprise one standard dynamic range area and a plurality of levels of extended dynamic range areas.

4. The method according to claim 1, wherein the method further comprises:

determining the brightness threshold based on the brightness histogram by using an OTSU algorithm.

5. The method according to claim 1, wherein the method further comprises:

calculating an average value M and a standard deviation STD of brightness values of all pixels in the exposure image, and calculating the brightness threshold T by using the following formula:

$$T = M + \beta \cdot STD$$

wherein $\beta$ is a standard deviation coefficient.

6. The method according to claim 1, wherein that the thresholding segmentation result corresponding to the original image comprises area class labels corresponding to pixels in the original image comprises:

the thresholding segmentation result is a data sequence;

the area class labels corresponding to the pixels in the original image are represented by values of corresponding elements in the data sequence, and the values of the elements in the data sequence comprise 0 and 1; and a pixel that is in the original image and that corresponds to an element whose value is 0 in the data sequence corresponds to the standard dynamic range area, and a pixel that is in the original image and that corresponds to an element whose value is 1 in the data sequence corresponds to the extended dynamic range area.

7. The method according to claim 1, wherein that the thresholding segmentation result corresponding to the original image comprises area class labels corresponding to pixels in the original image comprises:

the thresholding segmentation result is a two-dimensional matrix;

the area class labels corresponding to the pixels in the original image are represented by values of corresponding elements in the two-dimensional matrix, and the values of the elements in the two-dimensional matrix comprise 0 and 1; and a pixel that is in the original image and that corresponds to an element whose value is 0 in the two-dimensional matrix corresponds to the standard dynamic range area, and a pixel that is in the original image and that corresponds to an element whose value is 1 in the two-dimensional matrix corresponds to the extended dynamic range area.

8. The method according to claim 1, wherein before the associatively storing the original image and the thresholding segmentation result corresponding to the original image, the method further comprises:

assuming that the thresholding segmentation result corresponding to the original image is I, performing downsampling processing on the thresholding segmentation result I corresponding to the original image to obtain a downsampled thresholding segmentation result I' corresponding to the original image; and the associatively storing the original image and the thresholding segmentation result corresponding to the original image comprises:

associatively storing the original image and the downsampled thresholding segmentation result I' corresponding to the original image.

9. A method for extending a dynamic range of an image, comprising:

obtaining an original image and a thresholding segmentation result corresponding to the original image, wherein the thresholding segmentation result corresponding to the original image comprises area class labels corresponding to pixels in the original image, the area class labels are used to indicate classes of areas corresponding to the pixels in the original image, the areas comprise a standard dynamic range area and an extended dynamic range area, a brightness value of a pixel in the standard dynamic range area is less than a brightness threshold, and a brightness value of a pixel in the extended dynamic range area is greater than or equal to the brightness threshold;

wherein the thresholding segmentation result is obtained based on brightness level information comprising an exposure image captured in a same scene as the original image, a photographed object in the exposure image is the same as a photographed object in the original image, and a brightness value of each pixel in the exposure image indicates a brightness value of a corresponding pixel in the original image;

wherein the obtaining of the thresholding segmentation result based on the brightness level information and the brightness threshold comprises obtaining, based on the brightness value of each pixel in the exposure image and the brightness threshold, the thresholding segmentation result corresponding to the original image; and wherein the method further comprises constructing a corresponding brightness histogram based on the brightness value of each pixel in the exposure image, wherein the brightness histogram is used to display quantities of pixels whose brightness values are 0, 1, . . . , and 255 in the exposure image, the brightness histogram comprises an x-axis and a y-axis, values on the x-axis represent brightness values 0, 1, . . . , 255, and values on the y-axis represent quantities of pixels;

obtaining, based on the brightness histogram, the quantities of pixels whose brightness values are 0, 1, . . . , k, . . . , and 255 in the exposure image, denoted as $y_0$, $y_1$, . . . , $y_k$, . . . , and $y_{255}$, wherein $y_0$ is a quantity of pixels whose brightness values x are 0 in the exposure image, $y_1$ is a quantity of pixels whose brightness values x are 1 in the exposure image, $y_k$ is a quantity of pixels whose brightness values x are k in the exposure image, and $y_{255}$ is a quantity of pixels whose brightness values x are 255 in the exposure image;

adding corresponding quantities of pixels one by one in descending order of brightness values x, and using a brightness value k as the brightness threshold when a total quantity of pixels obtained when the addition reaches the quantity $y_k$ of pixels corresponding to the brightness value k is greater than a preset quantity; and performing dynamic range extension on the extended dynamic range area in the original image based on the thresholding segmentation result corresponding to the original image, to generate an extended dynamic range image corresponding to the original image, wherein a dynamic range of the extended dynamic range image is greater than a dynamic range of the original image.

10. The method according to claim 9, wherein the performing dynamic range extension on the extended dynamic range area in the original image based on the thresholding segmentation result corresponding to the original image, to generate an extended dynamic range image corresponding to the original image comprises:

for each pixel P in the original image, determining, based on the area class labels that correspond to the pixels in the original image and that are comprised in the thresholding segmentation result corresponding to the original image, whether the pixel P corresponds to the standard dynamic range area or the extended dynamic range area; and applying an extension coefficient $\alpha_P$ to the pixel P based on the determination of whether the pixel P corresponds to the standard dynamic range area or the extended dynamic range area, the applying comprising:

in response to a determination that the pixel P corresponds to the standard dynamic range area, setting the extension coefficient $\alpha_P$ to 1, and directly using R, G, and B values of the pixel P as R, G, and B values of a pixel P' that is in the extended dynamic range image and that corresponds to the pixel P; and in response to a determination that the pixel P corresponds to the extended dynamic range area, setting the extension coefficient $\alpha_P$ to a value greater than or equal to 1, multiplying R, G, and B values of the pixel P by the extension coefficient $\alpha_P$ to obtain new R, G, and B values, and using the new R, G, and B values as R, G, and B values of a pixel P' that is in the extended dynamic range image and that corresponds to the pixel P.

11. The method according to claim 10, wherein for a pixel P determined to correspond to the extended dynamic range area, applying the extension coefficient $\alpha_P$ comprises:

converting the R, G, and B values of the pixel P into a grayscale value Gray;

obtaining, based on a tone mapping function F(x), a tone mapping function value F(Gray) corresponding to the grayscale value Gray, wherein the tone mapping function F(x) is a monotonically non-decreasing function, and F(x)≥1; and using the tone mapping function value F(Gray) as the extension coefficient ap corresponding to the pixel.

12. A method for extending a dynamic range of an image, comprising:

obtaining original image information, wherein the original image information comprises an original image and brightness level information, and the brightness level information is used to indicate a brightness value of a pixel in the original image;

obtaining, based on the brightness level information and a brightness threshold, a thresholding segmentation result corresponding to the original image, wherein the thresholding segmentation result corresponding to the original image comprises area class labels corresponding to pixels in the original image, the area class labels are used to indicate classes of areas corresponding to the pixels in the original image, the areas comprise a standard dynamic range area and an extended dynamic range area, a brightness value of a pixel in the standard dynamic range area is less than the brightness threshold, and a brightness value of a pixel in the extended dynamic range area is greater than or equal to the brightness threshold; and associatively storing the original image and the thresholding segmentation result corresponding to the original image, for subsequently performing tone mapping and performing dynamic range extension on the extended dynamic range area in the original image based on a brightness value and RGB values of each pixel in the original image and the thresholding segmentation result corresponding to the original image, to generate an extended dynamic range image corresponding to the original image, wherein a dynamic range of the extended dynamic range image is greater than a dynamic range of the original image, wherein the brightness level information is an exposure image captured in a same scene as the original image, and a photographed object in the exposure image is the same as a photographed object in the original image; a brightness value of each pixel in the exposure image indicates a brightness value of a corresponding pixel in the original image; and the obtaining of the thresholding segmentation result corresponding to the original image comprises obtaining, based on the brightness value of each pixel in the exposure image and the brightness threshold, the thresholding segmentation result corresponding to the original image, and wherein the method further comprises:

constructing a corresponding brightness histogram based on the brightness value of each pixel in the exposure image, wherein the brightness histogram is used to display quantities of pixels whose brightness values are 0, 1, . . . , and 255 in the exposure image the brightness histogram comprises an x-axis and a y-axis, values on the x-axis represent brightness values, which are sequentially 0, 1, . . . , and 255, and values on the y-axis represent quantities of pixels;

obtaining, based on the brightness histogram, the quantities of pixels whose brightness values are 0, 1, . . . , k, . . . , and 255 in the exposure image, denoted as $y_0$, $y_1$, . . . , $y_k$, . . . , and $y_{255}$, wherein $y_0$ is a quantity of pixels whose brightness values x are 0 in the exposure image, $y_1$ is a quantity of pixels whose brightness values x are 1 in the exposure image, $y_k$ is a quantity of pixels whose brightness values x are k in the exposure image, and $y_{255}$ is a quantity of pixels whose brightness values x are 255 in the exposure image; and adding corresponding quantities of pixels one by one in descending order of brightness values x, and using a brightness value k as the brightness threshold when a total quantity of pixels obtained when the addition reaches the quantity $y_k$ of pixels corresponding to the brightness value k is greater than a preset quantity.

13. The method according to claim 12, wherein the obtaining, based on the brightness value of each pixel in the exposure image and the brightness threshold, the thresholding segmentation result corresponding to the original image comprises:

determining one brightness threshold based on the brightness value of each pixel in the exposure image, and performing single-level thresholding segmentation on the exposure image based on the one brightness threshold to obtain a thresholding segmentation result corresponding to the original image, wherein the thresholding segmentation result corresponding to the original image comprises area class labels corresponding to pixels in the original image, the area class labels are used to indicate classes of areas corresponding to the pixels in the original image, and the areas comprise one standard dynamic range area and one extended dynamic range area.

14. The method according to claim 12, wherein the obtaining, based on the brightness value of each pixel in the exposure image and the brightness threshold, the thresholding segmentation result corresponding to the original image comprises:

determining a plurality of brightness thresholds based on the brightness value of each pixel in the exposure image, and performing multi-level thresholding segmentation on the exposure image based on the plurality of brightness thresholds to obtain a thresholding segmentation result corresponding to the original image, wherein the thresholding segmentation result corresponding to the original image comprises area class labels corresponding to pixels in the original image, the area class labels are used to indicate classes of areas corresponding to the pixels in the original image, and the areas comprise one standard dynamic range area and a plurality of levels of extended dynamic range areas.

15. The method according to claim 12, wherein the method further comprises:

determining the brightness threshold based on the brightness histogram by using an OTSU algorithm.

16. The method according to claim 12, wherein the method further comprises:

calculating an average value M and a standard deviation STD of brightness values of all pixels in the exposure image, and calculating the brightness threshold T by using the following formula:

$$T = M + \beta \cdot STD$$

wherein $\beta$ is a standard deviation coefficient.

* * * * *